US009709791B2

(12) United States Patent
Hemmer

(10) Patent No.: US 9,709,791 B2
(45) Date of Patent: Jul. 18, 2017

(54) SYSTEMS AND METHODS FOR IMAGING TISSUE

(71) Applicant: Lucid, Inc., Rochester, NY (US)

(72) Inventor: Paul Hemmer, Rochester, NY (US)

(73) Assignee: LUCID, INC., Rochester, NY (US)

( * ) Notice: Subject to any disclaimer, the term of this patent is extended or adjusted under 35 U.S.C. 154(b) by 629 days.

(21) Appl. No.: 13/963,151

(22) Filed: Aug. 9, 2013

(65) Prior Publication Data

US 2014/0049632 A1 Feb. 20, 2014

Related U.S. Application Data

(60) Provisional application No. 61/683,417, filed on Aug. 15, 2012.

(51) Int. Cl.
*G02B 21/36* (2006.01)
*G02B 21/00* (2006.01)

(52) U.S. Cl.
CPC ......... *G02B 21/367* (2013.01); *G02B 21/008* (2013.01); *G02B 21/0012* (2013.01); *G02B 21/0028* (2013.01)

(58) Field of Classification Search
None
See application file for complete search history.

(56) References Cited

U.S. PATENT DOCUMENTS

| 5,034,613 A | 7/1991 | Denk et al. |
| 5,788,639 A | 8/1998 | Zavislan et al. |
| 5,880,880 A | 3/1999 | Anderson et al. |
| 5,995,867 A | 11/1999 | Zavislan et al. |
| 7,394,592 B2 | 7/2008 | Fox et al. |
| 7,859,749 B2 | 12/2010 | Fox et al. |
| 7,864,996 B2 | 1/2011 | Hemmer et al. |

(Continued)

FOREIGN PATENT DOCUMENTS

| WO | WO-2004104645 A2 | 12/2004 |
| WO | WO-2008028745 A1 | 3/2008 |

OTHER PUBLICATIONS

"Optical characterization of disease tissues using low-coherence interferometry," Proc. Of SPIE, vol. 1889 (1993), 18 pages.

(Continued)

*Primary Examiner* — Kate Luo
(74) *Attorney, Agent, or Firm* — Goodwin Procter LLP

(57) ABSTRACT

Method and system for imaging tissue, including (i) causing a macroscopic image of a tissue surface to be displayed on a visual display; (ii) receiving a selection of at least one portion of the macroscopic image; (iii) causing a plurality of confocal images captured by a confocal imager at different depths in a portion of the tissue to be displayed; (iv) receiving a selection of at least one target depth image; and (v) for each selected target depth image, instructing the confocal imager to capture a plurality of additional images at different locations and at a common depth with the target depth image. A system for imaging tissue having a macroscopic display module; a first selection module; a confocal display module; a second selection module; and an instruction module for instructing a confocal imager to capture a plurality of images at different locations over a selected region of the tissue.

23 Claims, 24 Drawing Sheets

(56) References Cited

U.S. PATENT DOCUMENTS

| | | | |
|---|---|---|---|
| 2006/0109438 A1* | 5/2006 | Smith | G03F 7/70725 |
| | | | 355/52 |
| 2007/0206275 A1 | 9/2007 | Hemmer et al. | |
| 2010/0150472 A1 | 6/2010 | Chen | |
| 2011/0188722 A1* | 8/2011 | Huang | G01R 33/56 |
| | | | 382/131 |

OTHER PUBLICATIONS

VivaScan Operations Guide—The Confocal Scanning Laser Microscope VivaScan Software, Rochester, NY, 69 pages.
International Search Report and Written Opinion mailed Dec. 4, 2014 in PCT/US2013/054276 (10 pages).
International Preliminary Report on Patentability in PCT/US2013/054276 dated Feb. 17, 2015 9 pages.
Office Action in Chinese Patent Application No. 201380051201.8 dated Aug. 25, 2016 13 pages.
Patent Examination Report in Australian Patent Application No. 2013302966 dated Sep. 13, 2016 2 pages.

* cited by examiner

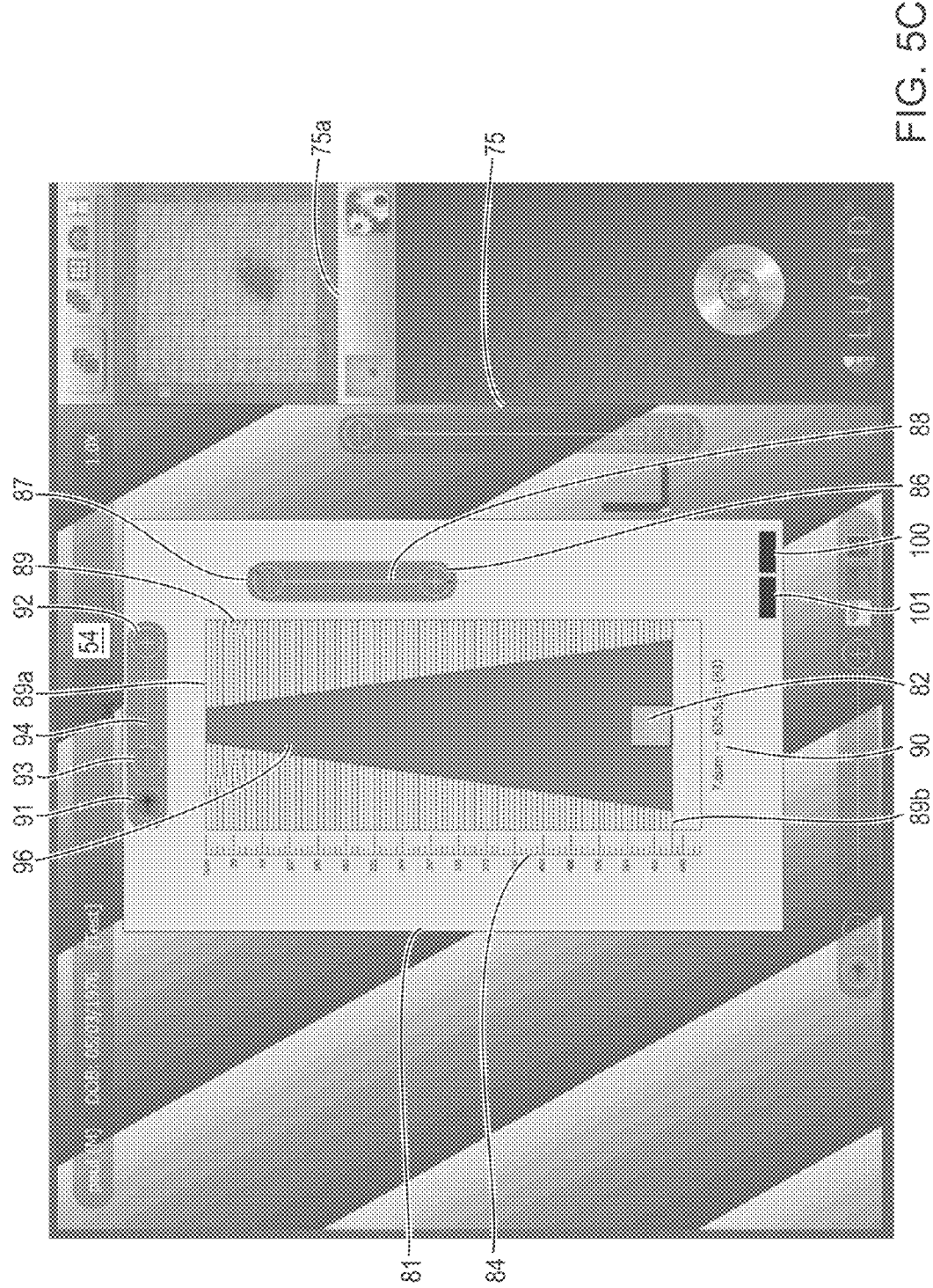

SYSTEMS AND METHODS FOR IMAGING TISSUE

RELATED APPLICATION

This application claims the benefit of priority under 35 U.S.C. §119(e) to U.S. Provisional Application Ser. No. 61/683,417 filed Aug. 15, 2012, the entirety of which is incorporated herein by reference.

FIELD OF THE INVENTION

Embodiments of the present invention relate to a user interface for a confocal microscope enabling clinicians or others to examine tissue at the macroscopic and microscopic levels and capture images suitable for pathological examination of such tissue.

BACKGROUND

Confocal microscopes optically section tissue to produce sectional microscopic images of tissue, referred to herein as confocal images. An example of a confocal microscope is the VivaScope® confocal microscope manufactured by Caliber Imaging & Diagnostics, Inc. (fka Lucid, Inc., hereinafter Lucid, Inc.) of Rochester, N.Y., U.S.A. Other examples of confocal microscopes are described in U.S. Pat. Nos. 5,788,639, 5,880,880, 7,394,592, 7,859,749, 5,995,867, and 7,864,996, incorporated herein in their entireties. A confocal microscope optically forms images of sections in non-histologically prepared naturally or surgically exposed in-vivo tissue, which are useful to evaluate a lesion in tissue without needing a biopsy and pathological evaluation on slides of histologically prepared, mechanically sectioned, tissue specimens from such biopsy. Also, confocal microscopes are useful for pathological examination of ex-vivo tissue, i.e., tissue removed from a patient, without requiring that such tissue be mechanically sectioned and histologically prepared for viewing on slides with a traditional microscope.

In particular, U.S. Pat. No. 7,864,996 describes a confocal microscope system for imaging tissue having a macroscopic imager for capturing a macroscopic image, and a confocal imager for capturing one or more optically formed sectional microscopic (confocal) images on or within tissue, a tissue attachment device, such as a tissue ring, in which the macroscopic imager and confocal imager are each individually presented to the tissue utilizing the tissue attachment device in a predefined alignment with the device, thereby imaging locations of the confocal imager with respect to the tissue surface spatially correlate with the macroscopic image. A computer system is coupled to the macroscopic imager and microscopic imager, and has a display, and memory for storing at least one macroscopic image received from the macroscopic imager and confocal images when received from the confocal imager. A user interface operable on the computer system enables display of the macroscopic image on a display coupled to the computer system, and then indicates a region within the macroscopic image associated with a field of view of the tissue imagible by the confocal imager. The user interface enables graphical tracking of the imaging location of the confocal imager in the macroscopic image, and targeting the confocal imager to capture confocal images at one or more imaging locations selected in the macroscopic image. The user interface also enables marking on the displayed macroscopic image of one or more locations of confocal images captured by the confocal imager that were selected by the user for storage in memory of the computer system. Such user interface generally has been incorporated in the VivaScope® 1500 confocal microscope.

SUMMARY

Using the confocal microscope of U.S. Pat. No. 7,864,996, a clinician or other trained user operates the confocal microscope by navigating the user interface on the display so as to select individual confocal images of tissue sections at desired location and at depths in the tissue with respect to a displayed captured microscopic image. To facilitate such confocal image acquisition, the system of U.S. Pat. No. 7,864,996 has two automated confocal image capture modes, called VivaStack® and VivaBlock® modes. In the VivaStack® mode, a group of confocal images are captured at successive depths in the tissue at a common location with respect to the tissue surface of the displayed macroscopic image. In the VivaBlock® mode, a group of confocal images are captured and then arranged as a composite image to map a region of tissue at a common depth in the tissue. A manual for a system employing the technology of U.S. Pat. No. 7,864,996, i.e., VivaScan Operations Guide, 2011, Lucid, Inc. is incorporated herein by reference in its entirety. Clinicians using the user interface of U.S. Pat. No. 7,864,996 may find it difficult to target the desired depth at which to capture an image in the VivaBlock® mode; further, the clinicians may also find it difficult to change characteristics of capture in the VivaStack® mode, such as number of sectional layers, depth, or confocal imaging power.

Accordingly, embodiments of the present invention provides an improved user interface for a confocal microscope, enabling additional functionality and ease of use for clinicians or other users in the examination of tissue by providing a visual method for selecting sites for gathering images, and by allowing ease of navigation, e.g., by a touch screen or a mouse, through collected images.

In an aspect, embodiments of the invention include a method for imaging tissue, the method including causing a macroscopic image of a tissue surface captured by a macroscopic imager to be displayed on a visual display. A selection of at least one portion of the macroscopic image is received. For each selected portion of the macroscopic image, a plurality of confocal images captured by a confocal imager at different depths in a corresponding portion of the tissue is caused to be displayed on the visual display. From among the plurality of confocal images, a selection of at least one target depth image is received. For each selected target depth image, the confocal imager is instructed to capture a plurality of additional images at different locations over a selected region of the tissue and at a common depth with the target depth image.

One or more of the following features may be included. The visual display may include a touch screen. Receiving the selection of the at least one portion of the macroscopic image may include identifying at least one touch of at least one portion of the macroscopic image displayed on the touch screen. Receiving the selection of the at least one target depth image may include identifying at least one touch of at least one confocal image displayed on the touch screen. Identifying the selected region of the tissue may include identifying at least one touch of the macroscopic image displayed on the touch screen.

The selected region of the tissue may correspond to a user-adjustable region overlaid upon the macroscopic image. A grid may be caused to be overlaid upon the macroscopic image, the grid dividing the macroscopic image into blocks representing frame positions of a stepper motor for the confocal imager.

After receiving the selection of the at least one portion of the macroscopic image, a graphical input for the confocal images to be captured may be caused to be displayed on the visual display.

The graphical input may include user-selectable inputs for selecting a depth of, layer count for, and laser power change with depth for the confocal images to be captured.

The plurality of additional images may be individually captured at the different locations over the selected region of the tissue. For at least one depth common to a selected target depth image, a composite image of the selected region of the tissue from the individually captured additional images may be formed. The composite image may be caused to be displayed on the visual display.

In another aspect, embodiments of the invention include a system for imaging tissue. The system includes computer memory for storing images captured by macroscopic and confocal imagers, and for storing code defining a set of instructions; and a processor for executing the set of instructions. The code includes an imaging module configured to (i) cause a macroscopic image of a tissue surface captured by the macroscopic imager to be displayed on a visual display; (ii) receive a selection of at least one portion of the macroscopic image; (iii) for each selected portion of the macroscopic image, cause a plurality of confocal images captured by the confocal imager at different depths in a corresponding portion of the tissue to be displayed on the visual display; (iv) receive a selection, from among the plurality of confocal images, of at least one target depth image; and (v) for each selected target depth image, instruct the confocal imager to capture a plurality of additional images at different locations over a selected region of the tissue and at a common depth with the target depth image.

One or more of the following features may be included. The visual display may include a touch screen. The imaging module, in receiving the selection of the at least one portion of the macroscopic image, may be configured to identify at least one touch of at least one portion of the macroscopic image displayed on the touch screen and/or to identify at least one touch of at least one confocal image displayed on the touch screen. The imaging module may be further configured to identify the selected region of the tissue by identifying at least one touch of the macroscopic image displayed on the touch screen.

The selected region of the tissue may correspond to a user-adjustable region overlaid upon the macroscopic image.

The imaging module may be configured to cause a grid to be overlaid upon the macroscopic image, the grid dividing the macroscopic image into blocks representing frame positions of a stepper motor for the confocal imager.

The imaging module may be configured to cause, after receiving the selection of the at least one portion of the macroscopic image, a graphical input for the confocal images to be captured to be displayed on the visual display. The graphical input may include user-selectable inputs for selecting a depth of, layer count for, and laser power change with depth for the confocal images to be captured.

The plurality of additional images may be individually captured at the different locations over the selected region of the tissue. The imaging module may be configured to form, for at least one depth common to a selected target depth image, a composite image of the selected region of the tissue from the individually captured additional images. The imaging module may be further configured to cause the composite image to be displayed on the visual display.

In yet another aspect, embodiments of the invention include a system for imaging tissue. The system includes (i) a macroscopic display module for causing a macroscopic image of a tissue surface captured by a macroscopic imager and stored in computer memory to be displayed on a visual display; (ii) a first selection module for receiving a selection of at least one portion of the macroscopic image; (iii) a confocal display module for causing a plurality of confocal images captured, for each selected portion of the macroscopic image, by a confocal imager at different depths in a corresponding portion of the tissue and stored in the computer memory to be displayed on the visual display; (iv) a second selection module for receiving a selection, from among the plurality of confocal images, of at least one target depth image; and (v) an instruction module for instructing the confocal imager to capture, for each selected target depth image, a plurality of additional images at different locations over a selected region of the tissue and at a common depth with the target depth image.

BRIEF DESCRIPTION OF THE DRAWINGS

The foregoing objects, features and advantages of embodiments of the invention will become more apparent from a reading of the following description in connection with the accompanying drawings, in which:

FIGS. 5A-5G are examples of a profile window in the VivaStack® mode on the user interface screen on display of FIG. 1A, enabling user selection of parameters, e.g., depth, number of sections or layers, and confocal imaging (laser) power along different layers, for acquisition in the VivaStack® mode;

FIG. 8 shows no target depth selection, and FIG. 9 shows an example of target depths selected for four different sets of images to be acquired in the VivaBlock® mode;

DETAILED DESCRIPTION

Figures 1A, 1B:
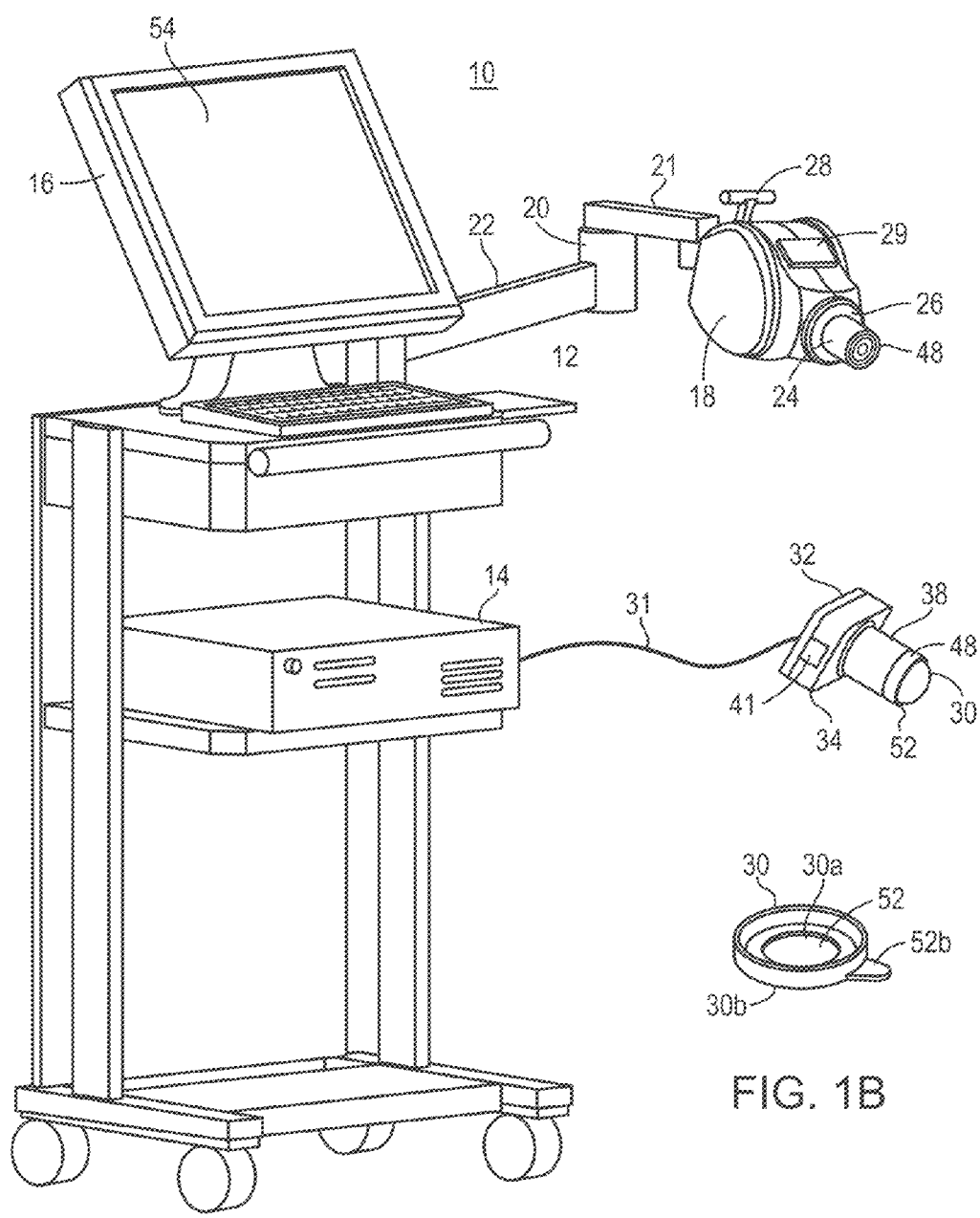
FIG. 1A is a schematic diagram of the system of an embodiment of the present invention having a confocal microscope with a confocal imager (or imaging head), a computer with a touch screen display, and a macroscopic imager.
FIG. 1B is a schematic diagram of a tissue attachment device, or tissue ring, attachable to the macroscopic imager and the confocal imager of FIG. 1A.

Referring to FIGS. 1A and 1B, system 10 has a confocal microscope 12 as described in previously mentioned U.S. Pat. Nos. 7,394,592 and 7,859,749, as well as in International Patent Application No. PCT/US04/16255 which is herein incorporated by reference in its entirety. A suitable confocal microscope may be a VivaScope® 1500 microscope manufactured by Lucid, Inc. of Rochester, N.Y. Confocal microscope 12 has a computer system 14, such as a personal computer (PC), coupled to a display 16 with a touch screen 54.

The computer system 14 receives confocal images representing optically formed microscopic sectional images, such as cells or other tissue structures, from a confocal imager (imaging head) 18 that is gimble mounted on a multi-axis arm mechanism 20 having front and rear arms 21 and 22. The confocal imager 18 has a nose tube 24, preferably made of clear plastic, which is attached to a conical hub 26 on the front of the confocal imager 18. Handles 28 are manually grasped and moved to permit multi-axis movement of the confocal imager. Cables extend along arms 21 and 22 to supply power and enable communication between confocal imager 18 and computer system 14.

As described in U.S. Pat. Nos. 7,394,592 and 7,859,749, and International Patent Application No. PCT/US04/16255, three stepper motor drivers are provided in confocal imager 18, which drive an X direction stage drive motor, a Y direction stage drive motor, and a motor which moves the objective lens of the confocal optics in the confocal imager in the Z direction, respectively, where X, Y, Z are orthogonal dimensions. In imaging tissue, X and Y dimensional are substantially parallel to the surface of tissue being imaged on or through, and Z is substantially perpendicular to such surface to control depth of confocal imaging. The motors may be driven by the user changing the imaging position via the computer system sending signals to such motor(s).

System 10 further has a macroscopic imager (or camera) 32 that is connected for data communication via a cable 31 to a port, such as a USB port, of computer system 14, so that the computer system can receive macroscopic images from imager 32. Conventional hardware and software at the imager 32 and computer system 14 may be provided for interfacing and communicating digital images. The macroscopic image provides a 10×10 mm macroscopic image to computer system 14, which may be, for example, 1000× 1000 pixels. This is in contrast with, e.g., the 4×4 mm imagible area of the confocal imager; the imagible area of the confocal imager may be a somewhat different size, such as, for example, 8×8 mm, or 20×20 mm. Macroscopic imager 32 may be a VivaCam® imager available from Lucid, Inc. of Rochester, N.Y. Such macroscopic imager, its use, and operation in system 10, may be similar to that of the macroscopic imager described in U.S. Pat. No. 7,864,996. Macroscopic imager 32 may also represent a conventional digital camera, which can be interfaced to computer system 12 so as to receive digital images from the camera. As also described in U.S. Pat. No. 7,864,996, a tissue attachment device provided by a tissue mount 48 to a tissue ring 30 having a window 52, can adhesively couple to tissue, where such tissue ring is separably mountable to the macroscopic imager and confocal imager. Tissue ring 30 represents a tissue attachment device having a central opening 30*a*. Tissue ring 30 may be made of metal material magnetically attractive to magnets so as to be releasably engagable by magnetic force to tissue ring mount 48. In use, a circular thin transparent material window 52, formed from, e.g., plastic or glass, is attached by a ring of adhesive (e.g., double-sided adhesive tape) to the lower face of tissue ring 30, the ring of adhesive being outside the field of view of opening 30*a*. A tab 52*b* extends from the window 52 for use in later detachment of window 52 from tissue ring 30, and for alignment as will be described later below. Another ring of adhesive (e.g., double-sided adhesive tape) is similarly outside the field of view of opening 30*a* along front surface 30*b* for attachment to tissue. The tissue ring 30 is shown attached to tissue in the example of FIGS. 3 and 4, whereby tissue is viewable through tissue ring opening 30*a* and extends beyond the attached tissue ring 30.

System 10 has a graphical user interface (GUI) representing a program or application operating in memory of the computer system 14. The code of the GUI may include an imaging module configured to (i) cause a macroscopic image of a tissue surface captured by the macroscopic imager to be displayed on a visual display; (ii) receive a selection of at least one portion of the macroscopic image; (iii) for each selected portion of the macroscopic image, cause a plurality of confocal images captured by the confocal imager at different depths in a corresponding portion of the tissue to be displayed on the visual display; (iv) receive a selection, from among the plurality of confocal images, of at least one target depth image; and (v) for each selected target depth image, instruct the confocal imager to capture a plurality of additional images at different locations over a selected region of the tissue and at a common depth with the target depth image.

The imaging module may include other modules, such as (i) a macroscopic display module for causing a macroscopic image of a tissue surface captured by a macroscopic imager and stored in computer memory to be displayed on a visual display; (ii) a first selection module for receiving a selection of at least one portion of the macroscopic image; (iii) a confocal display module for causing a plurality of confocal images captured, for each selected portion of the macroscopic image, by a confocal imager at different depths in a corresponding portion of the tissue and stored in the computer memory to be displayed on the visual display; (iv) a second selection module for receiving a selection, from among the plurality of confocal images, of at least one target depth image; and (v) an instruction module for instructing the confocal imager to capture, for each selected target depth image, a plurality of additional images at different locations over a selected region of the tissue and at a common depth with the target depth image.

The user interface may be enabled by the touch screen 54 of display 16 and computer system 14 coupled thereto enabling a user to operate system 10 from the touch screen 54. Other pointing mechanisms (e.g., mouse, track ball, or the like) may be used instead of, or in addition to, touch screen 54 to similarly enable the user to select move, select (click) and/or drag a displayed graphical elements.

Figure 1C:
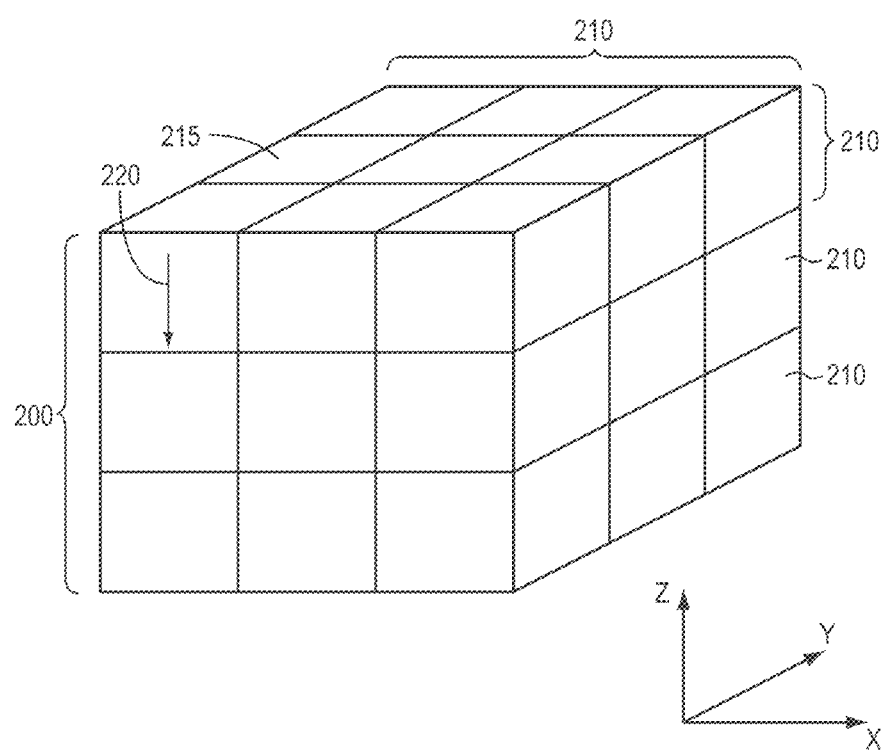
FIG. 1C is a schematic diagram illustrating the relationship of images captured in VivaStack® and VivaBlock® modes.

Referring to FIG. 1C, in the following discussion, the terms VivaStack® and VivaBlock® are used which are also described in U.S. Pat. No. 7,864,996. A VivaStack® mode is a programmed operation of system 10 to automatically operate confocal imager 18 to capture and then store in computer memory a series 200 of confocal images each at different Z motor stage positions, but at the same X and Y confocal image location stage location. In other words, a confocal image set obtained in the VivaStack® mode is a set or group of multiple confocal images at successive depths in the tissue at a common X, Y frame location. The VivaBlock® mode is a programmed operation of system 10 to automatically operate confocal imager 18 to capture and then store in computer memory a series 210 of confocal images each at different X and Y confocal image location stage locations, but at the same Z motor stage position which are then joined together into a single composite confocal image. A user may review a macroscopic image 215, and then prepare a series of 200 of images in the VivaStack® mode. The user may also review the series 200 of images obtained in the VivaStack® mode, and select a target depth 220 for further review. Then, the user may request or review a series 120 of images all taken at a common depth, i.e., the target depth 220, in the VivaBlock® mode. In other words, an image obtained in the VivaBlock® mode represents images of tissue sections arranged to map a region of tissue at a common depth in the tissue. In summary, FIG. 1C depicts layers 210 defined by acquisition of images in the VivaBlock® mode, with each column denoting a series 200 of images captured in the VivaStack® mode.

In the discussion of the GUI of system 10 terms, such as touch, select, tap, press, drag, click, are used herein to describe the operation of the user's finger touching the screen 54 (or close enough to the screen to sense the finger) to enable a desired operation as typical of a graphical user interface touch screen hardware and software operating on computer system 14 and display 16.

Figure 2:
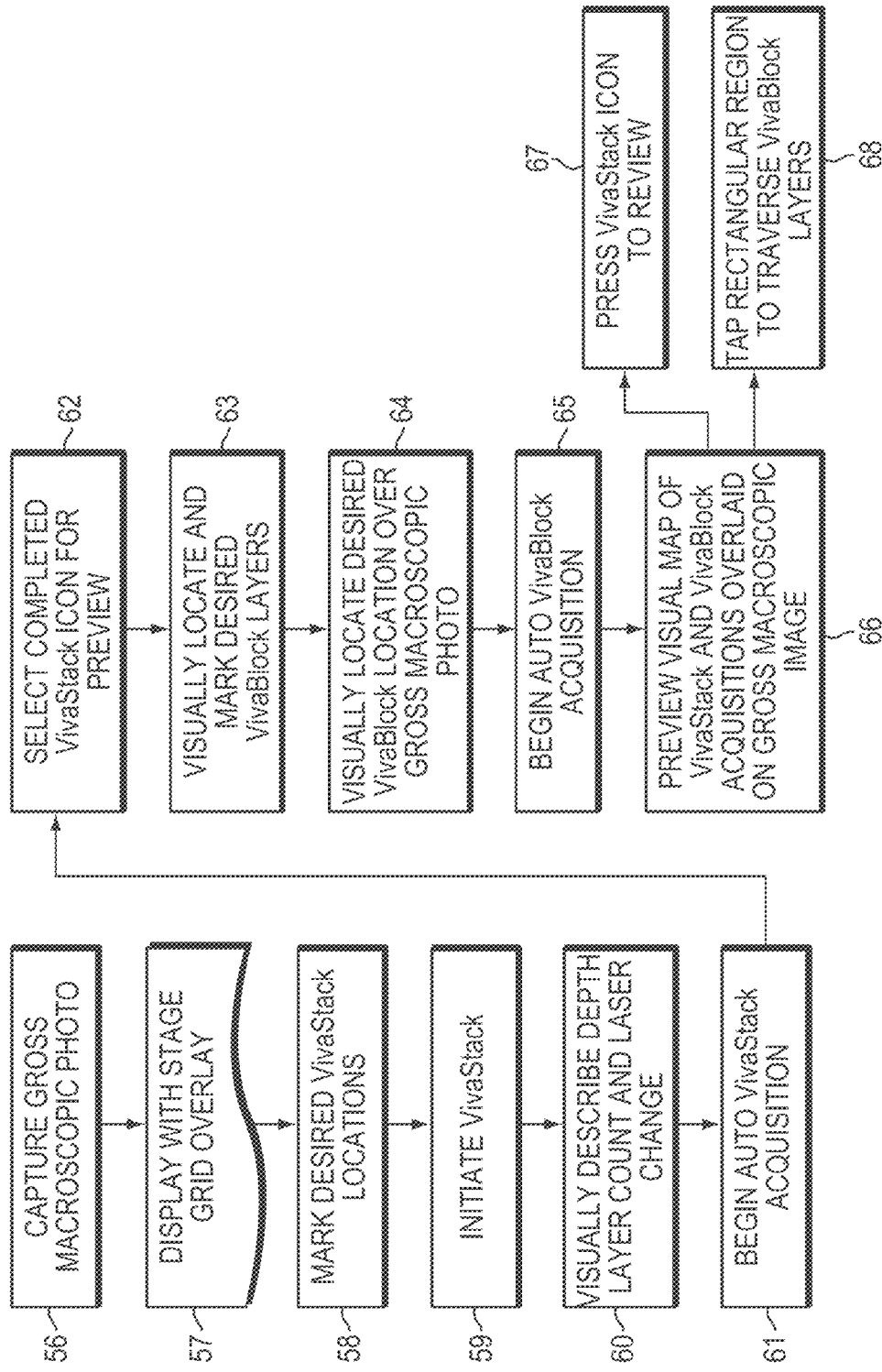
FIG. 2 is a flow chart showing automatic mode operation of the system of FIG. 1A for acquisitions of one or more sets of images captured in the VivaStack® and VivaBlock® modes.

Referring to FIG. 2 a flow chart of the operation of the system 10 of FIG. 1A is shown, which will be discussed in connection with user interface screen 54 of FIGS. 3-15. At step 56, macroscopic imager 32 is located on the tissue 70, such as a lesion 72 or other tissue structure of interest, to be confocally imaged while the tissue ring 30, and window 52 attached thereto, is attached to imager 32, and the tissue ring 30 and window 52 is adhesively attached to tissue, as described in U.S. Pat. No. 7,864,996. Preferably, the user views the tissue 70 on screen 54 as digital video images in window 75 so that the lesion 72 is shown as in the example of FIG. 3, and then the user applies sufficient pressure on the macroscopic imager 32 in the direction of the tissue such that adhesive on the lower surface of the window 52 facing the tissue adheres and retains the tissue ring and window assembly on the tissue.

With the tissue ring 30 adhesively coupled to the tissue, a macroscopic image is then captured. When macroscopic imager 32 is a VivaCam® camera sold by Lucid, Inc., the imager 32 has a handle and a trigger to start, stop, or reset the camera. The user applies pressure on the housing 34 of macroscopic imager 32 in the direction of the tissue which in response slides forward with respect to tissue ring 30 and at least part of nose tube 38 so as to actuate a mechanical switch in imager 32 to capture high resolution macroscopic image 74 of the lesion 72, in window 75.

Optionally, a switch or button 41 on the macroscopic imager 32 or a touch button on screen 54 may be used to capture one of the digital video images in window 75 as macroscopic image 74. Next, the macroscopic imager 32 is then detached from the tissue ring 30, and confocal imager 18 attached and aligned to the tissue ring for capture of confocal images as described in U.S. Pat. No. 7,864,996.

User interface screen 54 has a mode selection and capture control panel 69 at the top right of screen having graphical buttons 77*a*, 77*b*, 77*c*, and 77*d* which the user may touch to select one of four modes of system 10 operation. Two automatic modes of operation may be selected by buttons: VivaStack® mode button 77*a* and VivaBlock® mode button 77*b*. Two manual modes of operation may be selected by buttons: single image capture mode button 77*c*, and video capture mode button 77*d*. The position of a slider 77*g* along horizontal slide 77*f* indicates the current mode of operation. A button 77*e* is also provided on control panel 69 which changes its icon or graphic in each of the different modes, and such button 77*e* enables the user to control operation(s) particular to the selected mode of system 10 operation, as will be described below in more detail.

Figure 3:
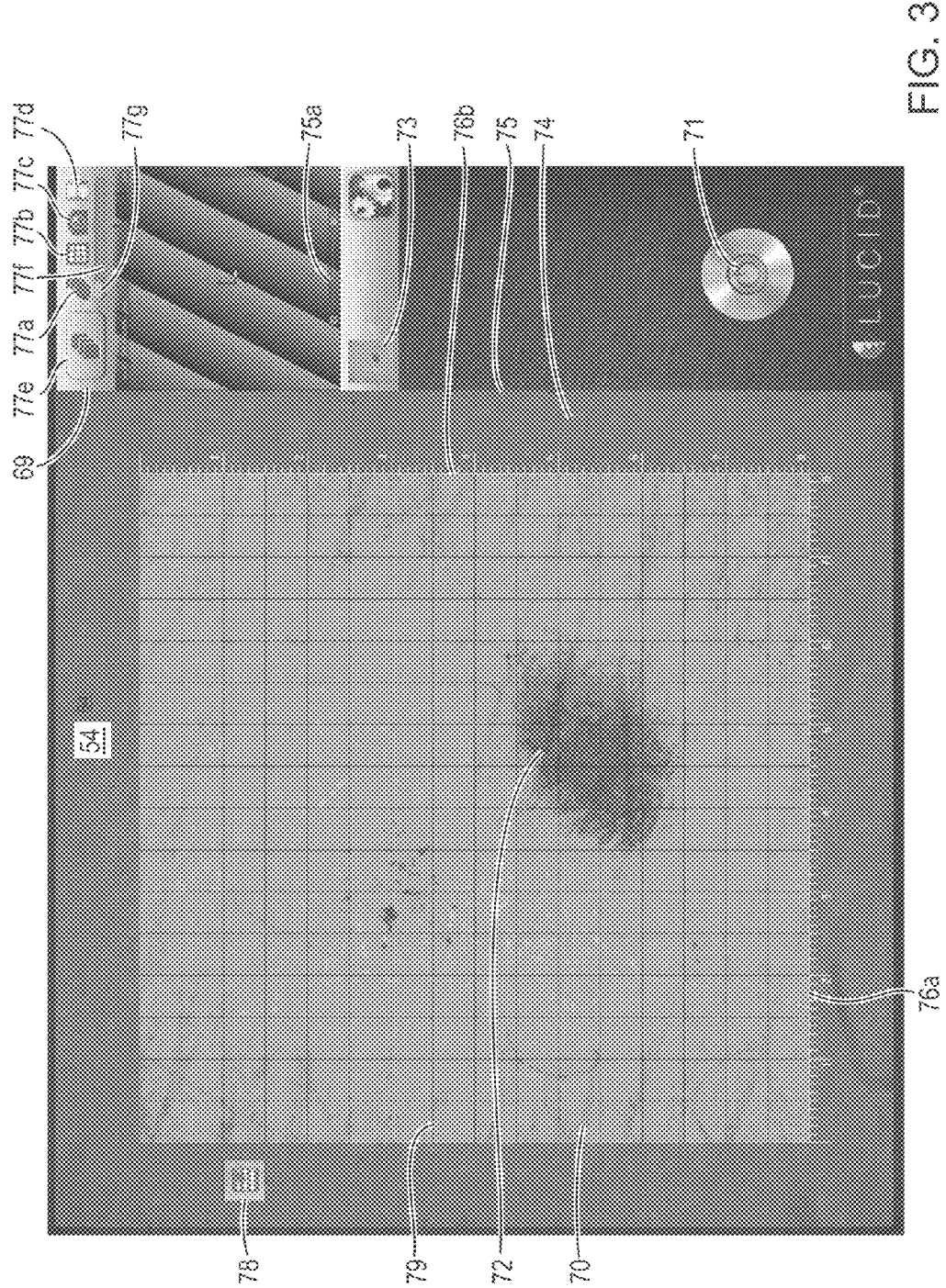
FIG. 3 is an example user interface screen on the display of the system of FIG. 1A after capture of a macroscopic image by the macroscopic imager.

After capture of the macroscopic image 74 the user interface screen 54 of FIG. 3 is shown with a grid 79 graphic overlaid upon image 74 (step 57). The X, Y stages of confocal imager 18 is represented as a grid 79 of whole frame motor positions. In one embodiment, the grid 79 divides the image into, e.g., 16×16 squares blocks, where each block represents a frame position of the confocal imager's X, Y stage motor. The number of squares in the grid may vary depending on stage size, e.g., 8×8 mm=16×16 frames, since 1 frame has a dimension of 0.5 mm. For example, such grid may be an 8 by 8 mm, as depicted by X and Y axes 76*a* and 76*b*, respectively. In another embodiment, the stage is further subdivided into selectable points for each possible X/Y coordinate, and the visible gridlines are hidden from view, allowing the X/Y motors to be at any possible location within the stage. Although system 10 defaults to VivaStack® mode after capture of macroscopic image 74 with button 77*e* having a VivaStack® mode graphic or icon (see FIG. 3), the system 10 is waiting for user selection of an action on screen 54.

Of the four modes of operation, the VivaStack® mode will first be discussed. To start VivaStack® Mode, the user taps on a graphical button 78 to enable "VivaStack® Layout" marking of desired VivaStack® mode locations at any desired location, e.g., (i) along one or more different square blocks in the grid 79 with respect to the displayed tissue in macroscopic image 74 or (ii) at overlapping grid edges. Another embodiment may not display the grid visually, allowing positioning at any point within the X/Y stage coordinates. In response to being enabled, button 78 changes in color, such as blue. The user then taps on one or more blocks in grid 79 to mark desired VivaStack® mode locations 80 as illustrated for example in FIG. 4 (step 58). At each location selected a graphical VivaStack® mode icon is then displayed in the block indicating its selection (step 58) with a push pin graphic. To remove a particular selected VivaStack® mode location 80, the user again taps at its location in grid 79. To disable "VivaStack® Layout" the user taps again on a graphical button 78 which changes back to its original color. In this manner, the user can select the locations at which acquisitions in the VivaStack® mode are desired. For example, VivaStack® mode locations 80 may be selected near the margins between the lesion and surrounding tissue, but any macroscopic image area of the tissue defined in grid 79 can be selected. If "VivaStack® Layout" is not enabled, the user may touch a block or drag his finger over blocks to navigate (positioning X, Y stage motors) the confocal imager 18 in X, Y directions.

Figure 5A:
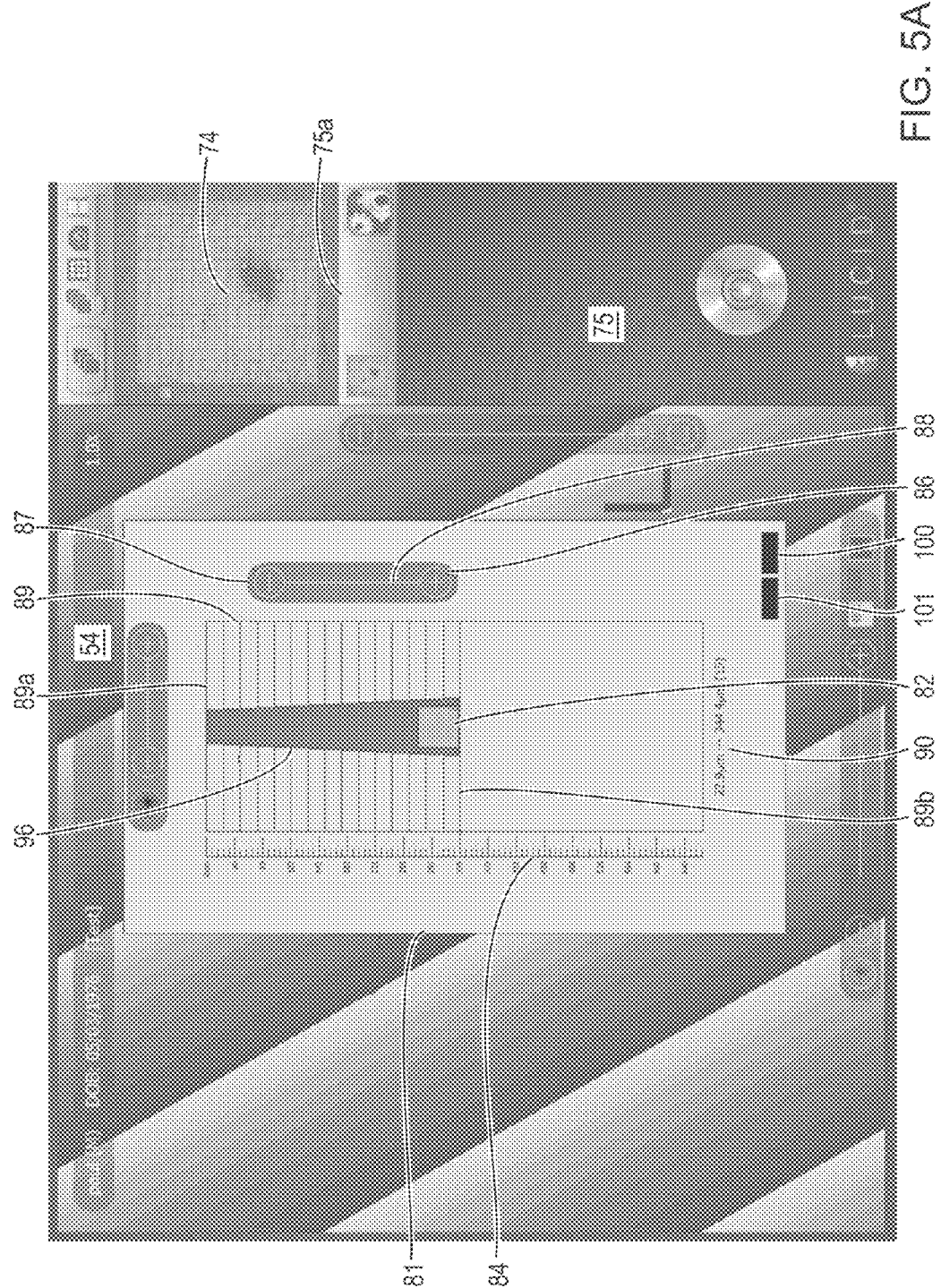

After the desired VivaStack® mode locations 80 are marked, the button 77e is then tapped by the user; since the system 10 is in VivaStack® mode, a start button is provided to start VivaStack® mode profile selection by a VivaStack® mode Profile window 81 being overlaid on the screen as shown in FIG. 5A (step 59). VivaStack® mode Profile window 81 enables the user to change parameters by which each VivaStack® will be automatically captured by system 10 (step 60). In particular, VivaStack® mode Profile window 81 graphically illustrates how the confocal imager 18 will automatically capture frames at fixed X, Y position through incrementing (or decrementing) depth Z. This enables the user to review, and if desired change, the VivaStack® mode target depth, number of layers (or section), and the laser power change with depth (confocal imager 18 produces images using illumination from a laser). Laser power increases in intensity with depth of a tissue section being imaged, as indicated graphically by the increasing width of area or region 96 as depth of imaging lowers along a vertical depth scale 84. Horizontal lines 89 along depth scale 84 represents each layer in the tissue that a confocal image will be captured in reference to its approximate depth along scale 84.

Figure 5B:
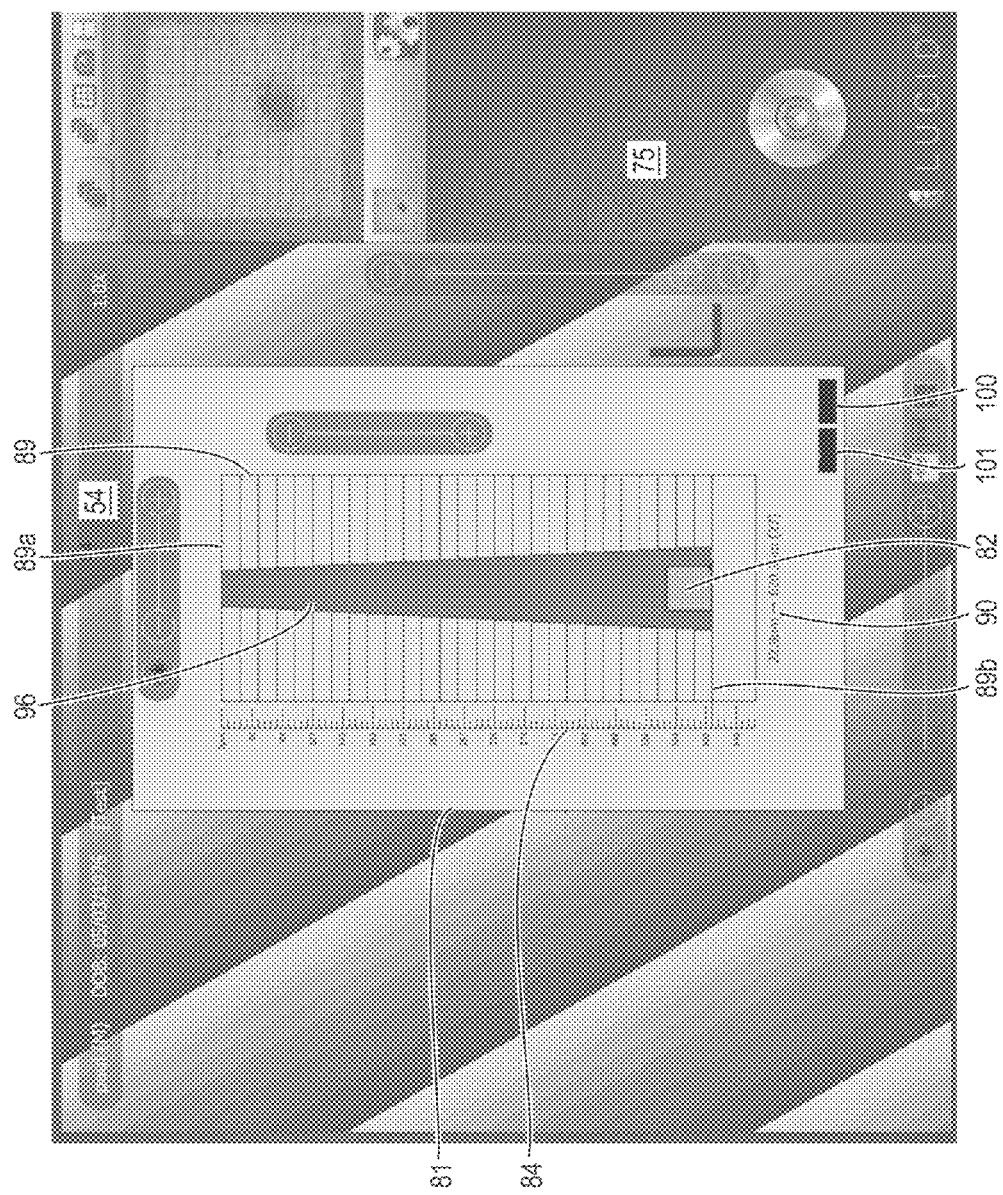

The VivaStack® mode Profile window 81 enables a user to select three parameters: depth, layer count, and laser power change with depth. The depth of the images collected in the VivaStack® mode is provided by the user dragging a slider 82 (e.g., small blue box) to the target depth as indicated by scale 84, such as shown for example by slider 82 of FIG. 5A being repositioned downward in FIG. 5B. Depth range 90 between the top layer 89a and lowest layer 89b is shown with the number of layers in parenthesis. For example, the target depth of layer 89b in FIG. 5A is 344.4 micrometers with 15 layers, and in FIG. 5B is 620.3 micrometers with 27 layers. The top horizontal line above line 89a represents the tissue surface at 0 micrometer. The start depth of the uppermost layer is the same in both cases at 22 micrometers or the user may flag a relative zero point. Below button 121 is a graphic icon for setting relative zero. This icon or button when tapped allows the user to set the current depth as "zero" and in so doing, set the starting depth of each set of images collected in the VivaStack® mode. If the user does not press this button to manually flag the current depth as zero, the system may automatically flag the current depth as relative zero and begin all stacks from that location. Accordingly, the images collected in the VivaStack® mode typically start from relative zero and relative zero is user defined, or, if not set by the user, it is set for the user at whatever depth the user is at when the user initiates acquisition of images in the VivaStack. The target depth moves in a quantized fashion based on possible Z motor step sizes (eliminating guesswork and rounding errors). Confocal imager's laser power at each of the layers 89 graphically depicted by shaded or dark area 96 such that the power increment between each layer 89 indicated by region 96 in increasing depth.

If the user wishes to add or decreases the number of layers in a set of images captured in the VivaStack® mode, a layer count is selected by buttons 86 and 87 in which the user may press the +/− buttons 86 and 87 on either side of vertical slider 88 to increase or decrease, respectively, the number of layers 89 to be captured between layers 89a and 89b. For example, in FIG. 5C the number of layers is increased to 83 as indicated graphically by additional horizontal lines between layers 89a and 89b. The depth range 90 may also change due to step size of movement of the Z stage motor. This also changes the depth difference between every two successive layers 89 from its default as shown in FIGS. 5A and 5B.

Figure 5D:
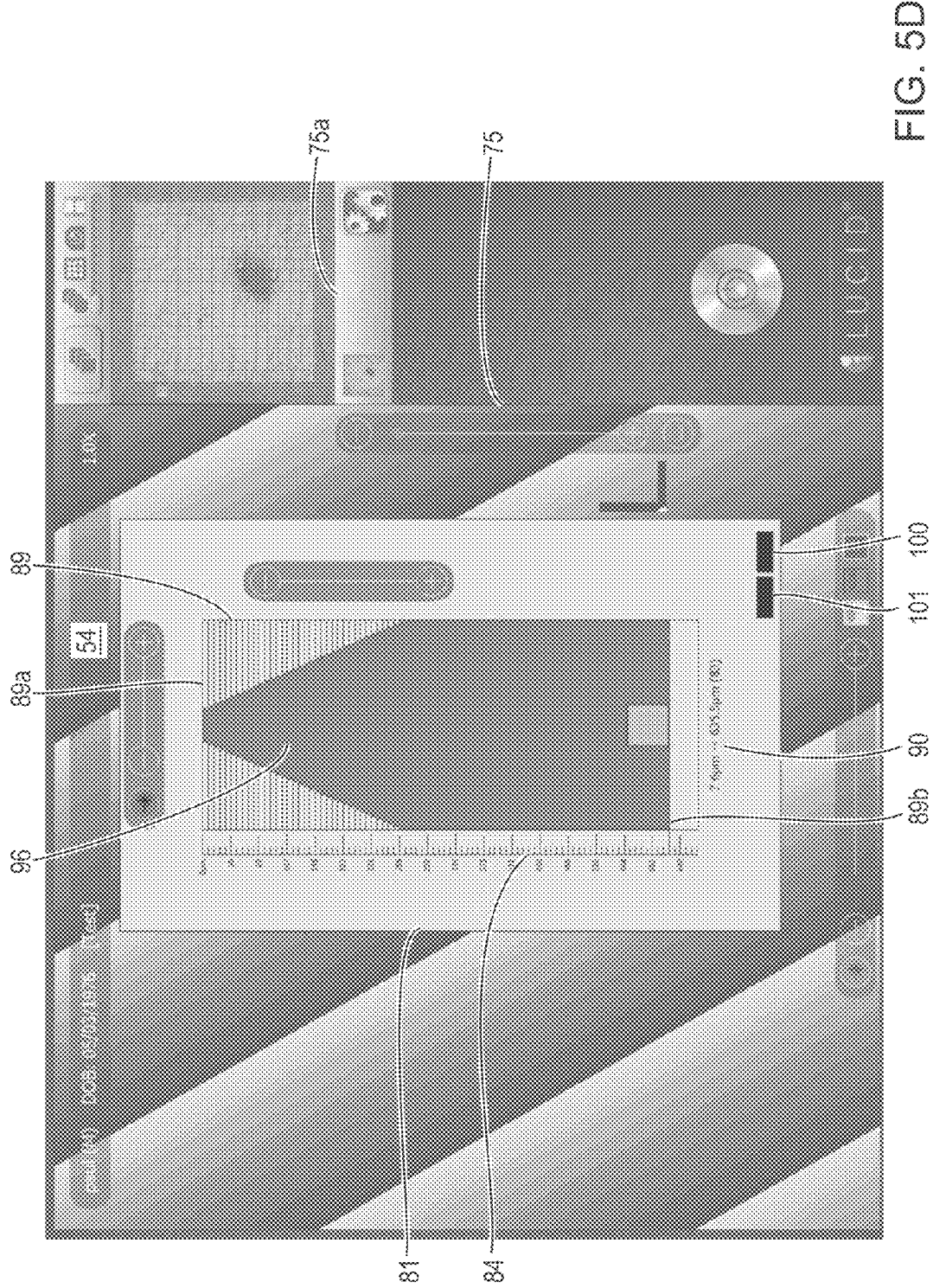
Figure 5E:
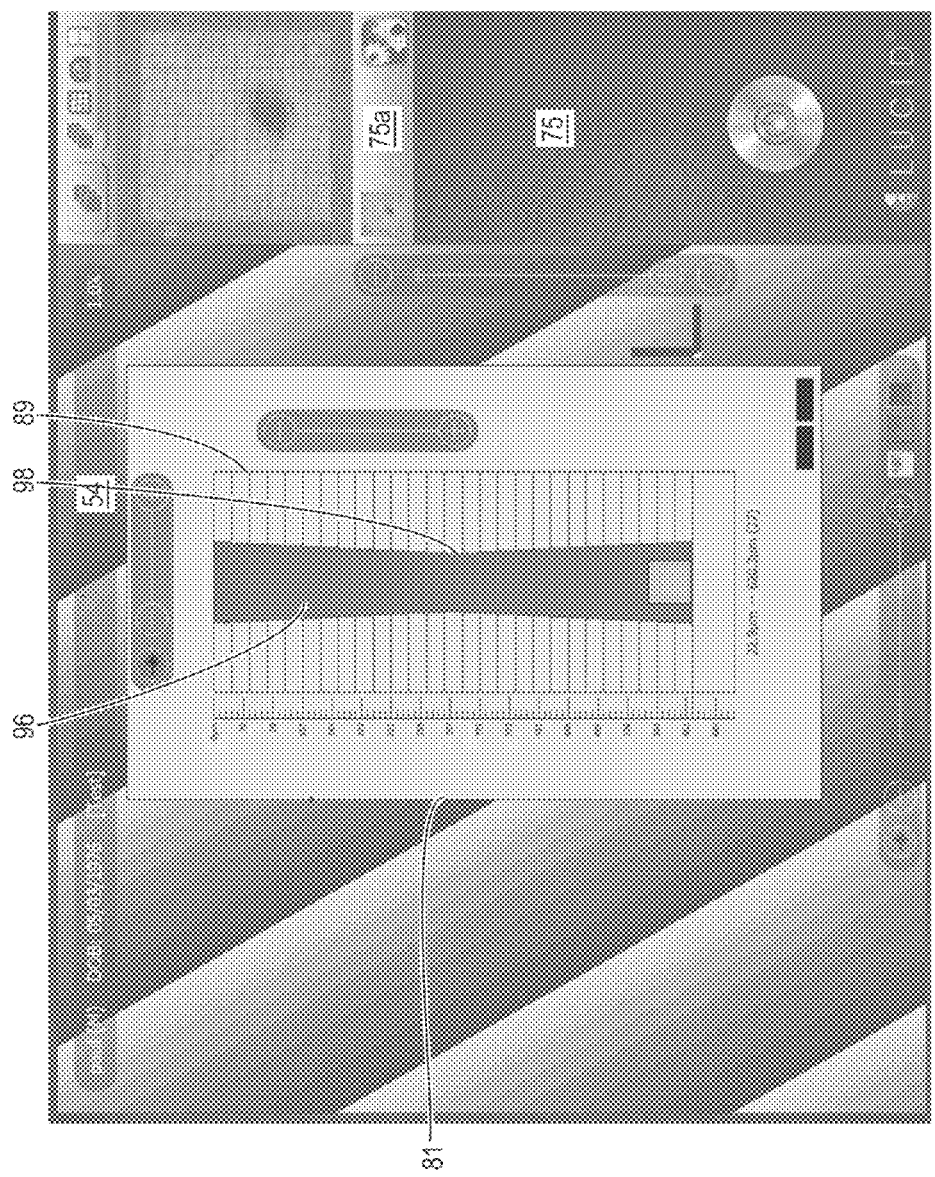

The laser power is selected by buttons 92 and 93 in which the user may press the +/− buttons 92 and 93 on the horizontal slider 94 to increase or decrease, respectively, the level of laser power (confocal imaging power) in terms of DAC counts (digital to analog conversion) to increment between each layer 89 as indicated by change in shape of area 96 such as shown in FIG. 5D from that of FIG. 5C. The user interface controls laser through a range of 0-255 DAC counts, and these counts produce a resulting laser power in milliwatts. Further, a user may simultaneously touch at or near two sides of the area 96 to increase or decrease its width to provide an even more tailor laser power profile. For example, in FIG. 5E the user may choose to "pinch" the laser power at desired layers 89 as indicated along portion 98 of area 96 so that the laser power increase and decrease through the depth range. Thus, the user can select a desired laser power profile when each set of images collected in VivaStack® mode is captured by confocal imager 18.

Figure 5F:
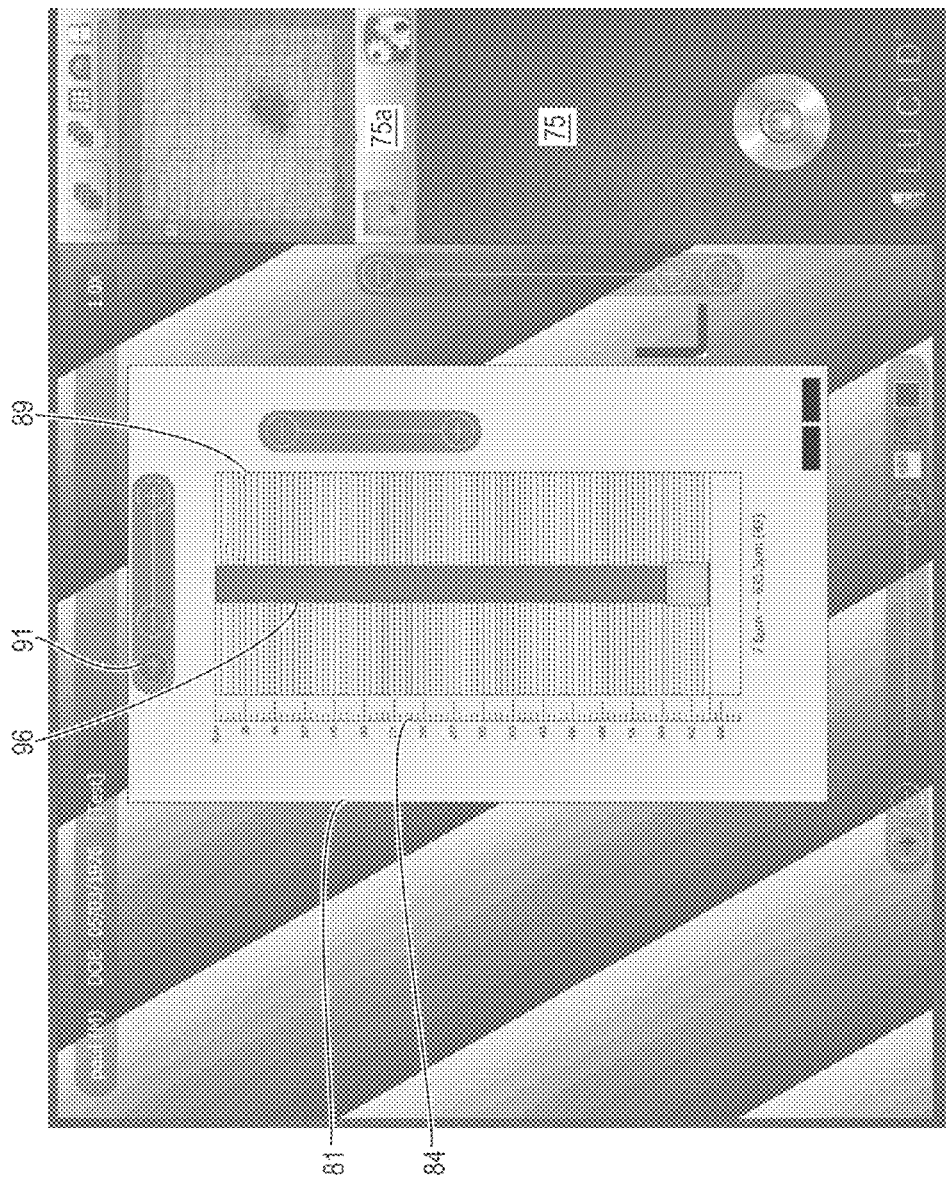

Optionally, the user may tap to instead use Auto Image Control (AIC) by activating the AIC button 91 which is then indicated by area 96 appearing as shown in FIG. 5F. AIC automatically selects laser power during confocal imaging which provides the best image by control laser power in accordance with values of pixels of the image within a desired range to avoid under or over exposed imaging. For purposes of illustration, this is shown by a narrowing of region 96, but other graphical illustration of AIC selection may be shown.

Figure 4:
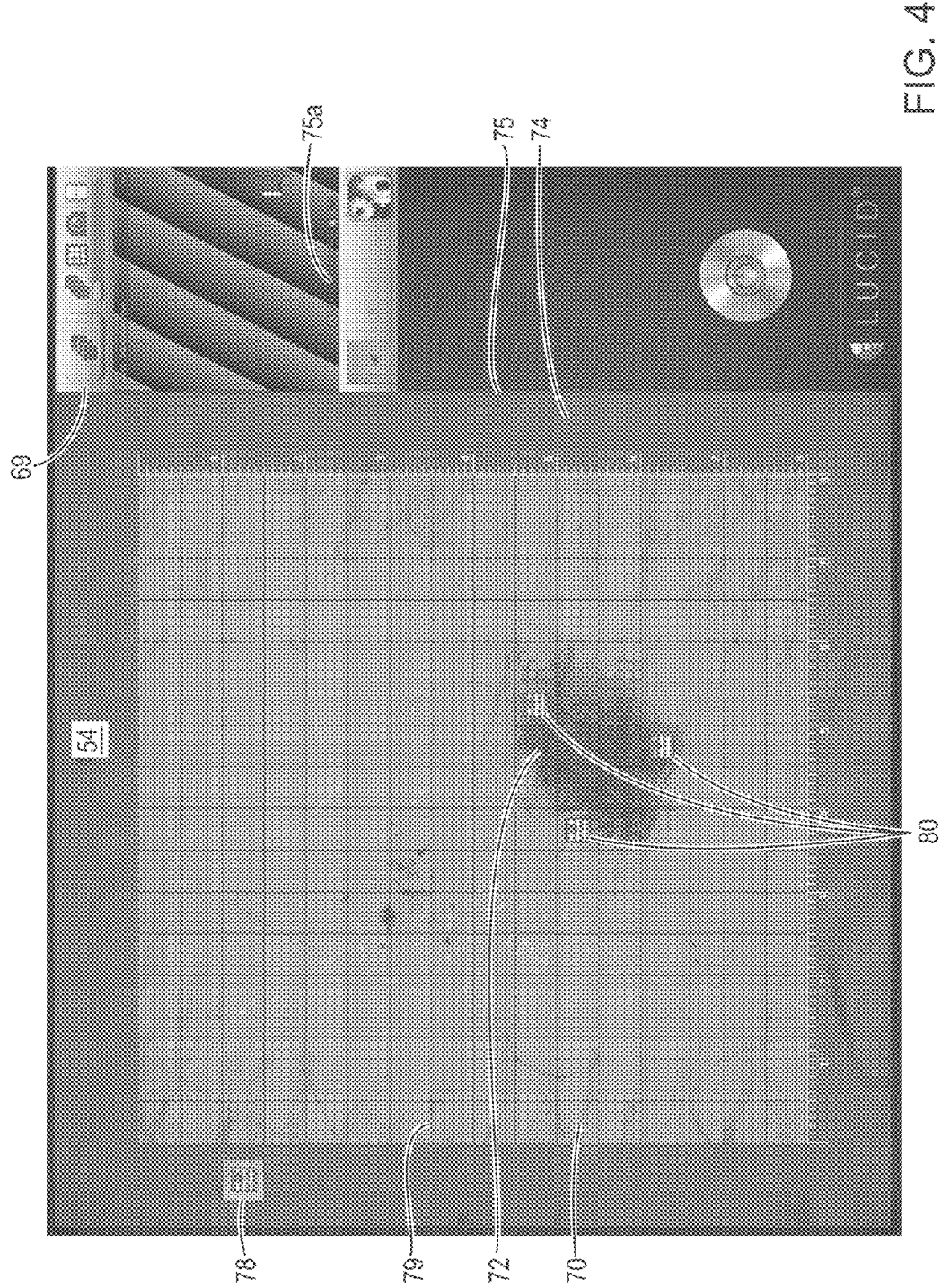
FIG. 4 is an example user interface screen on the display of FIG. 1A showing icons overlaid on the macroscopic image marking of locations for desired acquisition in the VivaStack® mode.

In FIGS. 5A-5G, the previous image in window 75 of FIGS. 3 and 4 has been reduced in resolution and displayed in window 75a. Window 75 now shows the displayed output confocal image of confocal imager 18. Previously, as in FIG. 3, window 75a shows the displayed output confocal image of confocal imager 18. Tapping anywhere on window 75a toggles or flips the images in windows 75 and 75a on screen 54, as desired. For purposes of illustration, during VivaStack® profile selection the confocal image of confocal imager 18 is shown in window 75. In window 75a, one of the blocks of grid 79 has an overlay color, such as blue, indicating the current position of the X, Y stage motors of confocal imager 18 of the image in window 75. Button 73 shows a thumbnail of the last image captured—be it the macroscopic image, a single frame capture, video, or a collection of images captured in the VivaBlock® or VivaStack® modes. By pressing button 73 the user gets a simple window.

When the VivaStack® mode profile selection is complete, the user taps the begin button 100 in VivaStack® mode profile window 81 to start acquisition in VivaStack® mode by system 10. If the user instead presses cancel button 101, window 81 is removed and the screen 54 of FIG. 4 is shown. The user may also cancel VivaStack® mode profile selection and close window 81 by tapping anywhere outside the profile window 81. The VivaStack® mode profile setting selected by the user such as shown in FIGS. 5A-5E may be saved in the memory of computer system 14 and retrieved for later re-execution, if desired. The user is not required to make any change to the acquisition parameters or settings for the VivaStack® mode, but may merely tap on Begin button 100 after the VivaStack® mode Profile window 81 first opens.

In response to the user selecting the begin button 100, system 10 operates confocal imager 18 to acquire the images at different depths for each selected VivaStack® mode location 80 as per the VivaStack® mode profile (step 61). System 10 automatically positions X, Y motors in accordance with a location 80 in accordance with its X, Y location on grid 79, and in Z motor steps in accordance with the VivaStack® mode profile layers 89 captures for each layer a sectional confocal image of the tissue via window 52 of the tissue ring 30. The images are stored in the memory of computer system 14.

Figure 6:
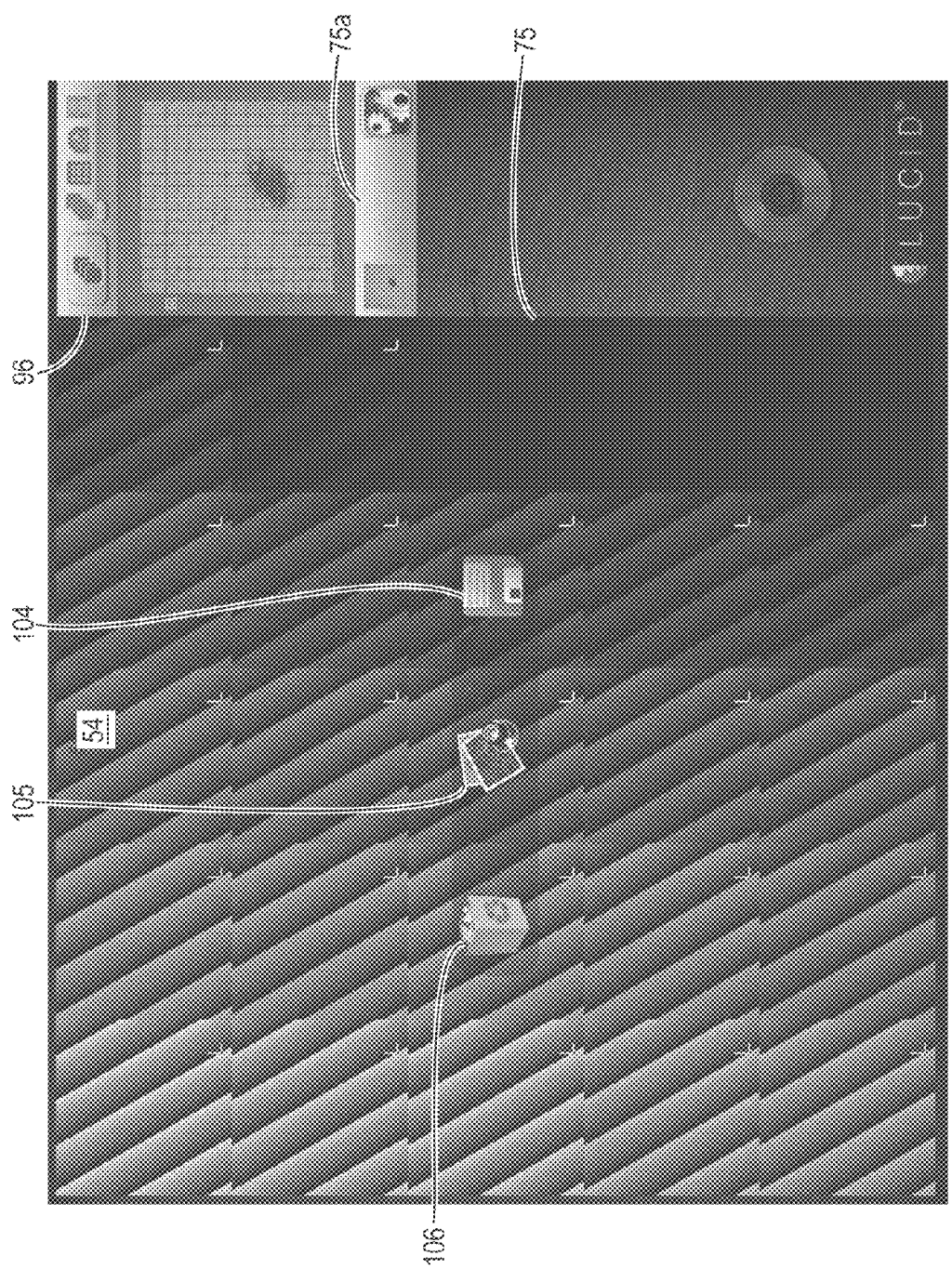
FIG. 6 is an example user interface screen on the display of FIG. 1A showing the images of each group of images after acquisition in the VivaStack® mode for user review and acceptance.

FIG. 6 represents screen 54 displayed briefly, such as a predefined 2-3 second wait period (or other predefined period in memory of computer system 10), between each set or group of images captured in the VivaStack® mode at each location 80 in order of acquisition with depth from top to bottom and left to right. This allows the user to accept the images by tapping icon or button 104, preview the images by playback in a slideshow in window 75 by tapping on icon or button 105, or delete the images by clicking on icon or button 106 if not acceptable. If the user does nothing after the wait period the images captured in the VivaStack® mode at that location 80 are automatically accepted at which point the system proceeds to acquire the next VivaStack® mode mark location 80, if any. In FIG. 6, the FIG. 4 screen is now in window 75a, and the block of VivaStack® marked location 80 related to images displayed in FIG. 6 is of a different color, such as blue, indicating that the current location of the X, Y motors of confocal imager 18. If user selects Cancel button 105, the entire process of capture in VivaStack® mode ends for that location and any location not yet captured in the VivaStack® mode. If earlier set(s) of images captured in the VivaStack® mode were accepted, then those are stored and later available for playback. All accepted set(s) of images captured in the VivaStack® mode are stored in the memory of computer system 10. If there is any requested set of images to be captured in the VivaStack® mode not yet started/completed, then it continues to be shown by its associated icon 80 when macroscopic image 74 is displayed. This allows the user to make adjustments, and then start again, whereby system 10 will essentially pick up where it left off in completing all acquisitions in the VivaStack® mode.

Figure 7:
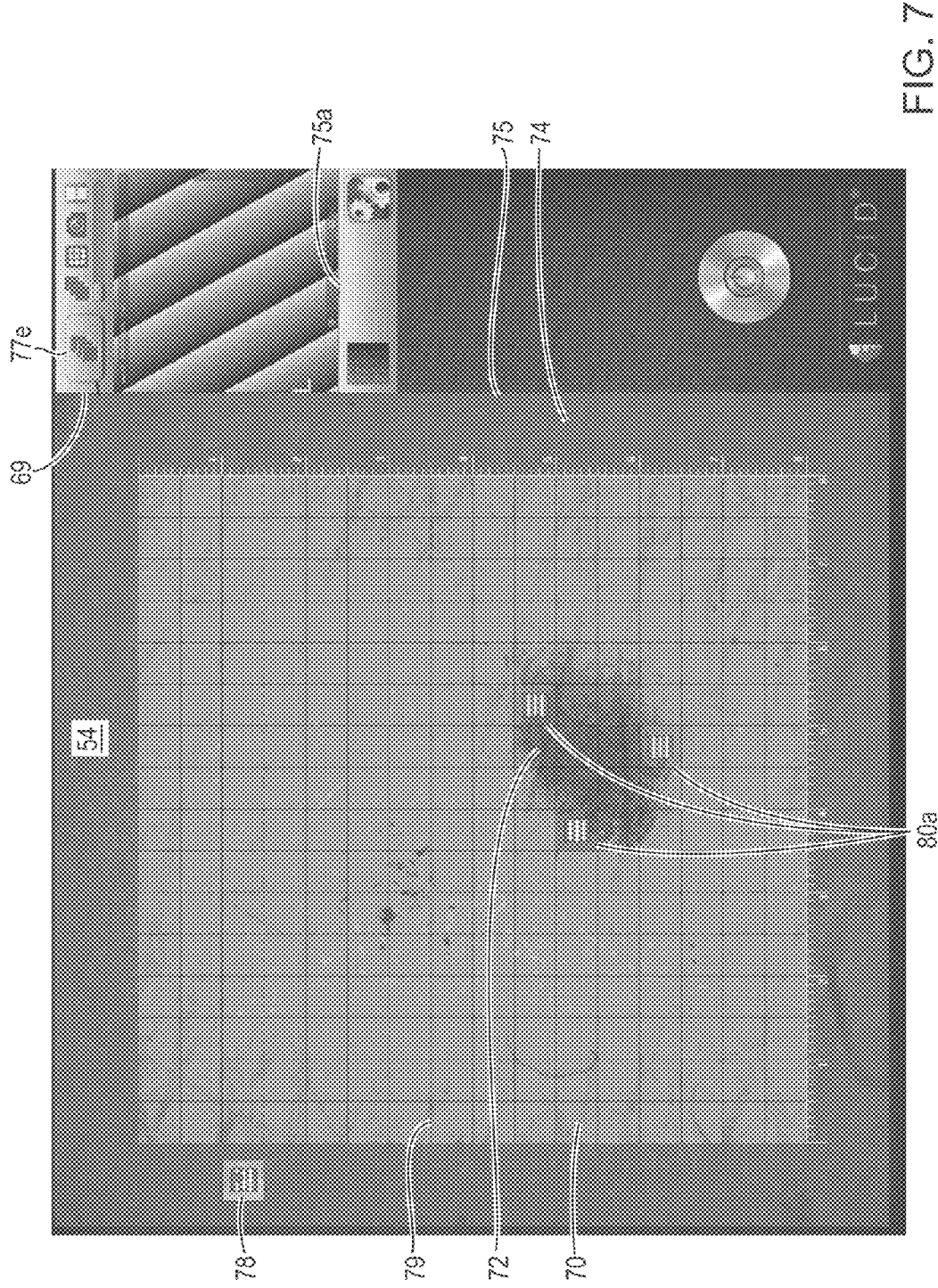
FIG. 7 is the same example screen of FIG. 4 in which the icons related to the VivaStack® mode have graphically changed to indicate completion of acquisitions in the VivaStack® mode.

At step 62, the sets of images acquired in the VivaStack® mode are graphically indicated as being completed on in the screen 54 of FIG. 7. The screen 54 of FIG. 7 is the same as in FIG. 4, but instead of VivaStack® mode location icons 80 on the screen, VivaStack® mode icons 80a appear, which are graphically changed (e.g., removal of push pin graphic) to show completion. For any set of images to be acquired in the VivaStack® mode that were not completed its icon will stay as icon 80, such as if the user cancelled any acquisition in the VivaStack® mode during review of FIG. 6. The user may optionally use enable button 78 to remove or select another location of images captured in the VivaStack® mode as described earlier in connection with FIG. 4 and then step 58-62 are repeated.

Figure 8:
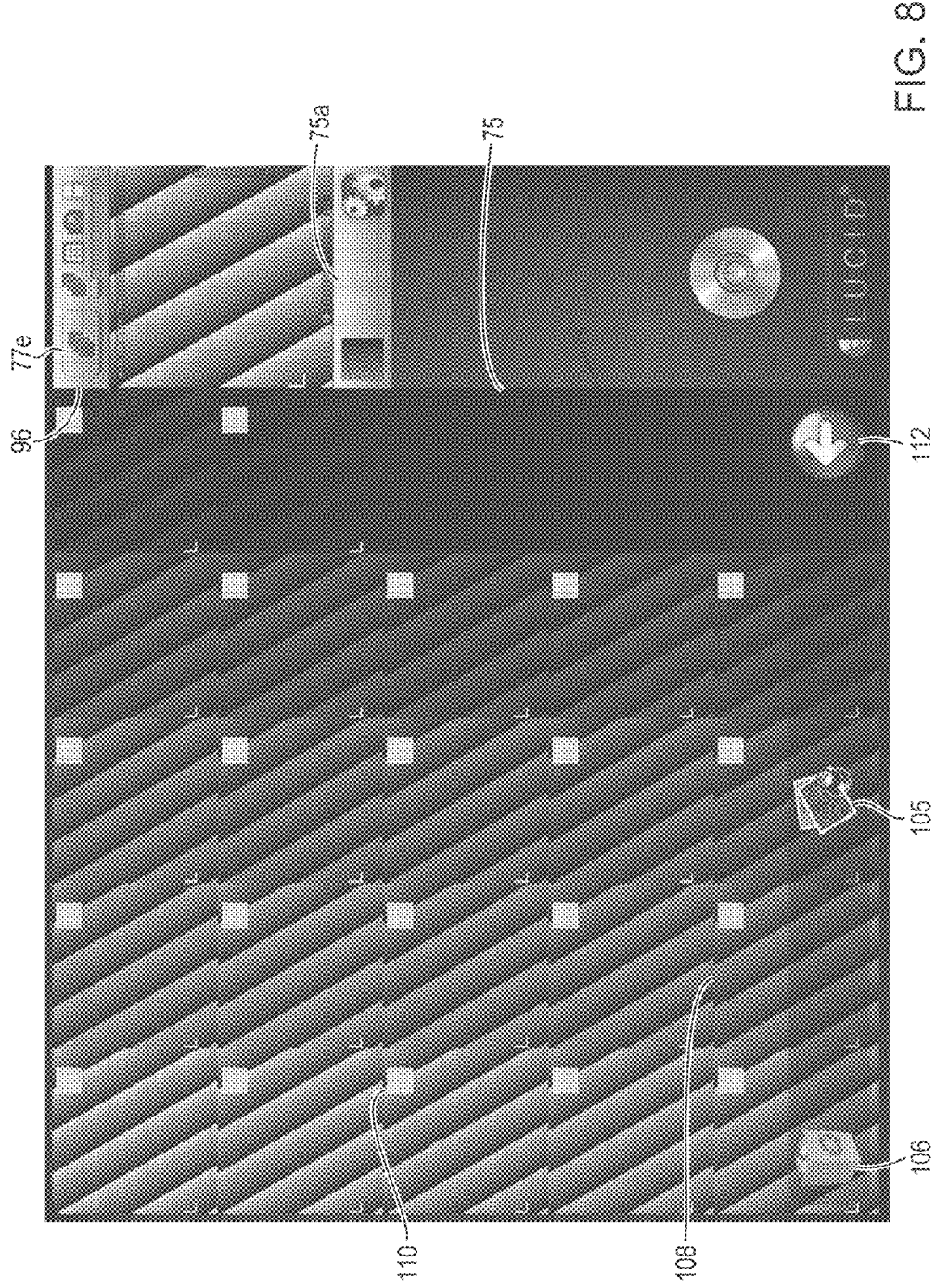
FIGS. 8 and 9 are example user interface screens on the display of FIG. 1A illustrating images captured at different depths in the VivaStack® mode, and user selection target depths for each VivaBlock® acquisition, where
Figure 9:
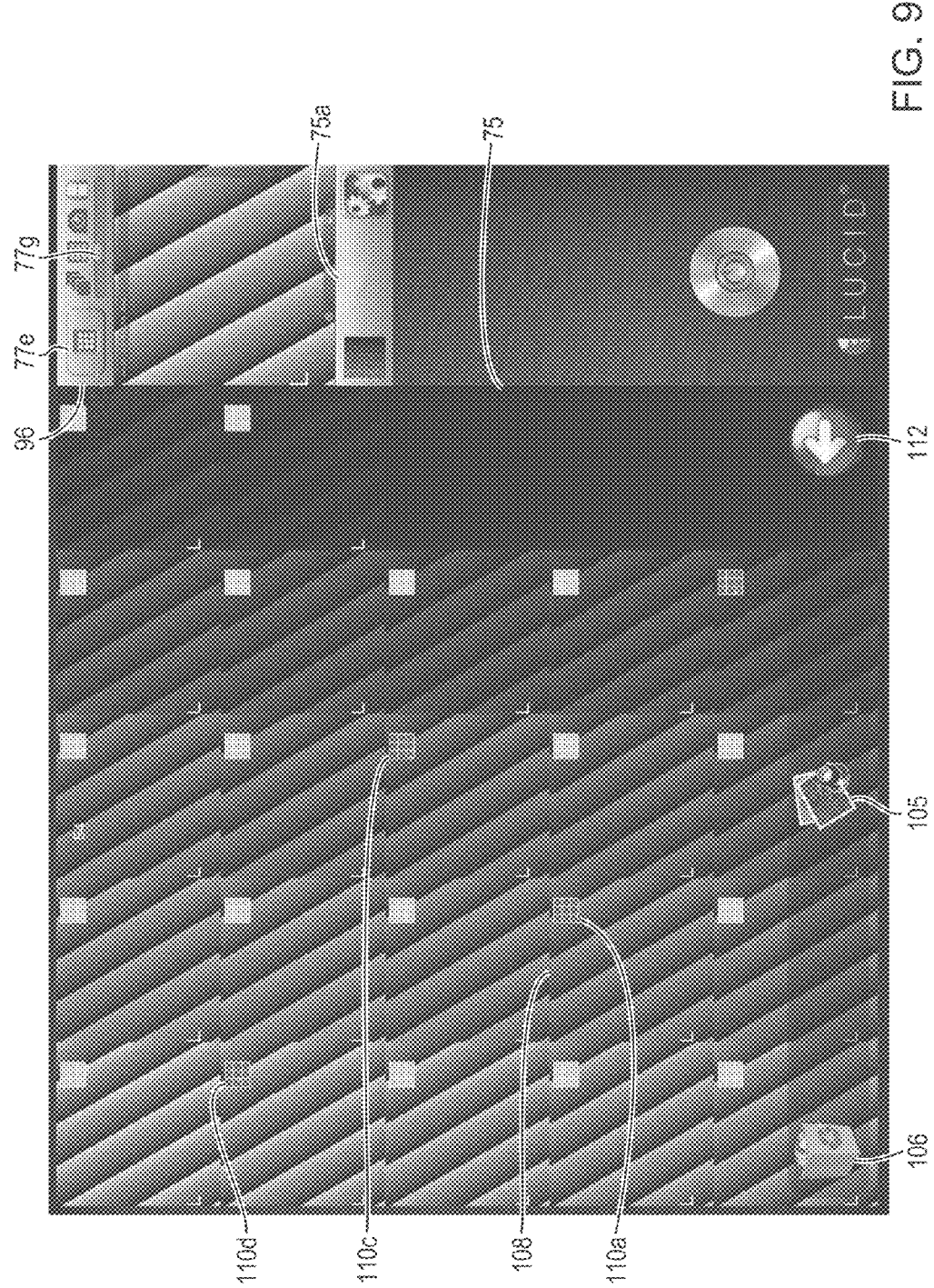
Figure 16:
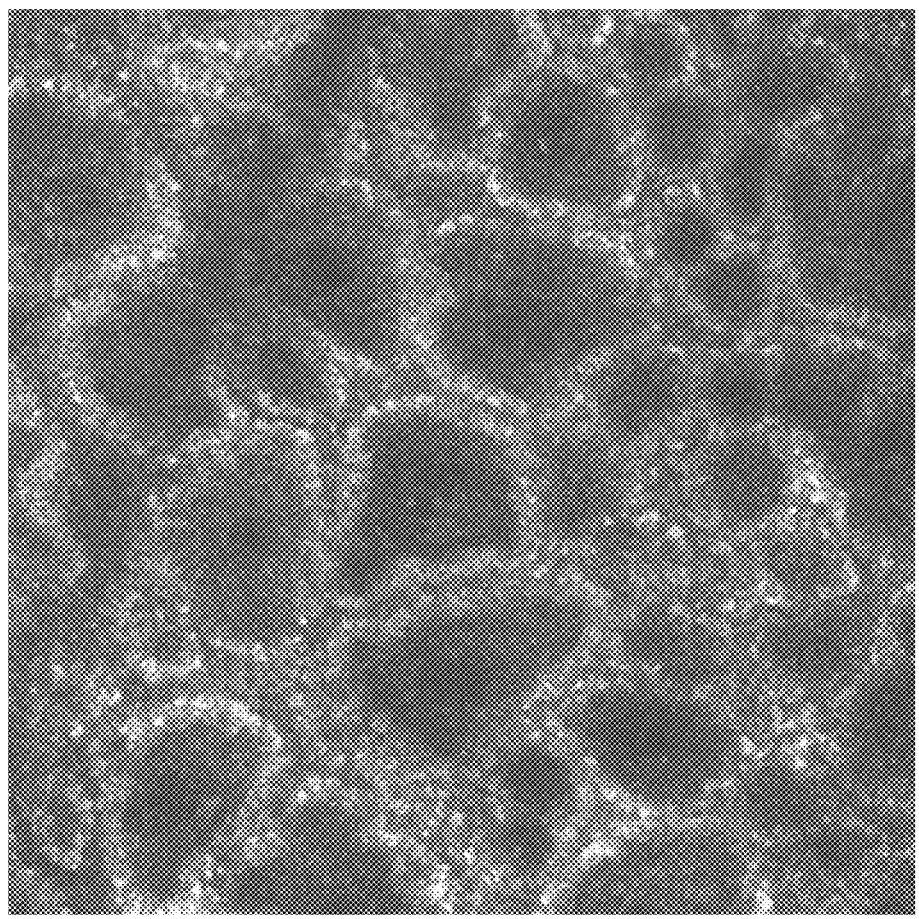
FIG. 16 is an example of a single image from the confocal imager of FIG. 1A that may be captured during an acquisition in the VivaStack® mode or single image capture manual mode.

At step 63, the user can then review the images at any completed set of images 80a captured in the VivaStack® mode by tapping on its corresponding location 80a on screen 54 as shown in FIG. 7. When a completed set of images captured in the VivaStack® mode at location 80a is tapped, system 10 in response loads and displays from memory of computer system 12 the captured images for that set of images, as shown for example in screen 54 of FIG. 8. Each confocal image 108 of such selected set of images captured in the VivaStack® mode is displayed in order of capture, i.e., with increasing depth, from top to bottom and left to right. For purposes of illustration, each image is illustrated by diagonal lines, but an example of a confocal image is shown in FIG. 16. Arrow button 112 when tapped returns to the screen 54 of FIG. 7. If icon or button 105 on the screen 54 of FIGS. 8 and 9 is tapped by the user, playback on the screen of images 108 in a slideshow in window 75 is enabled. However, the user can remove the images captured in the VivaStack® mode and being displayed in FIG. 8 by pressing the icon or button 106, which return the screen to that of FIG. 7 with the location 80a of the removed set of images captured in the VivaStack® mode also removed.

In screen 54 of FIG. 8, during any review of images captured at location 80a in the VivaStack® mode, the user uses such images to select depth for capture of images in the VivaBlock® mode. Each image 108 contains an icon 110 that when clicked acts to visually define a depth at which the user would like to proceed to capture images in the VivaBlock® mode. The icon 110 when clicked by the user graphically changes (e.g., color and grid illustration) to indicate selection of a set of images captured in the VivaBlock® mode at the depth of the Z stage where that image was captured, as shown for example in screen of FIG. 9 by selected icons 110a,b,c,d. One or more depths may be selected by selecting icons 110 of different images 108. To deselect, the icon 110 may again be clicked. The act of having selected one or more layers at which to perform acquisition of images in the VivaBlock® mode automatically activates the VivaBlock® mode as shown by the control panel 69 of FIG. 9. If desired, the user may press the arrow button 112 acts as a back button to return the user to the previous screen, allowing subsequent review of other image sets.

Figure 10:
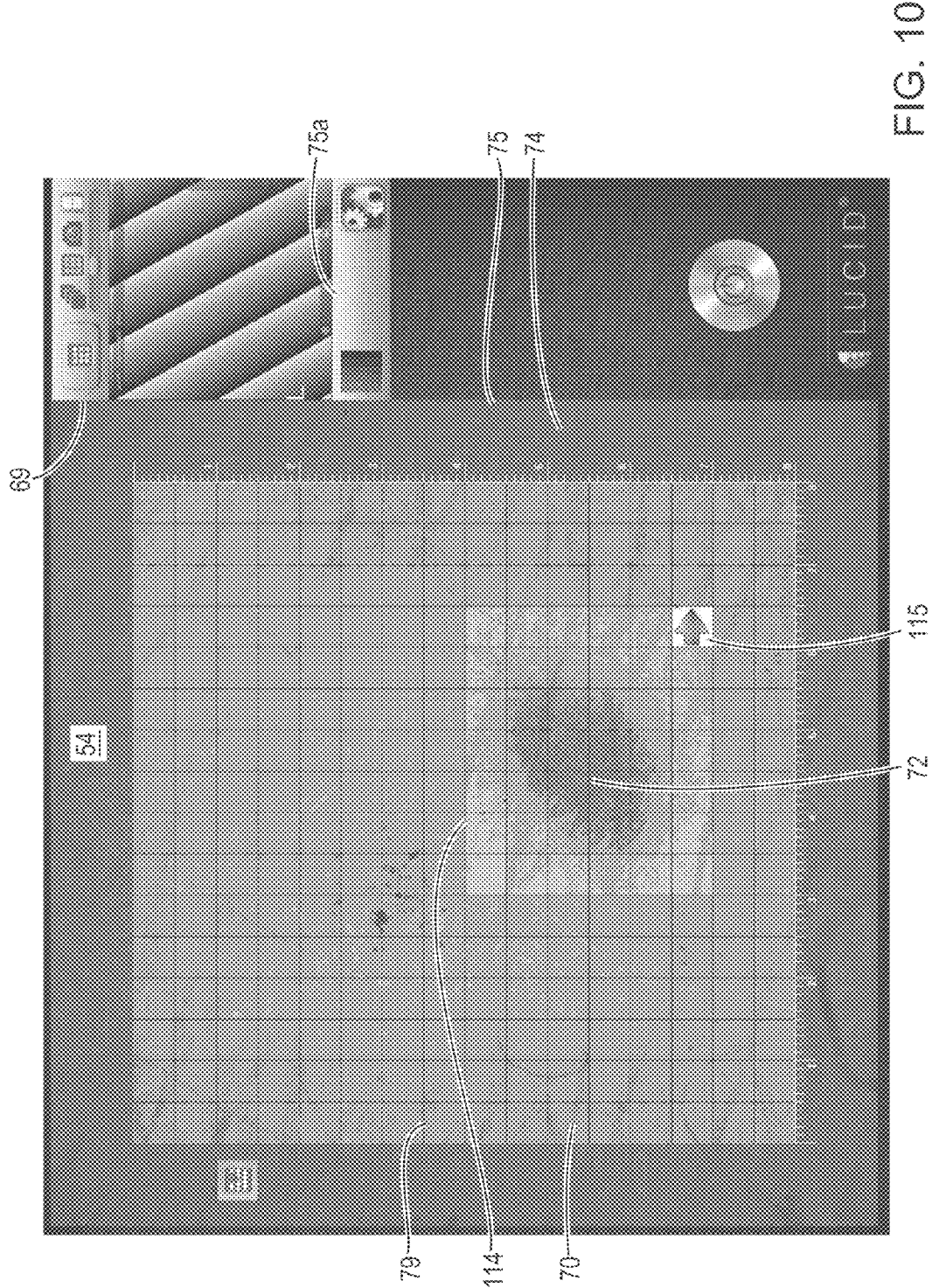
FIG. 10 is an example user interface screen on the display of the system of FIG. 1A showing, with respect to the macroscopic image, an overlaid user selected region for VivaBlock® acquisition after target depths for each image captured in the VivaBlock® mode were selected as shown for example in FIG. 9.

After one or more desired target depths for VivaBlock® mode acquisition are marked by selected icons 110, the button 77e (now with a VivaBlock® graphic) may then be tapped by the user to start region selection for the VivaBlock® mode acquisition as shown for example in screen 54 on FIG. 10 having macroscopic image 74 with overlaid grid 79. This screen enables the user to select the VivaBlock® mode layout using an adjustable rectangular region 114 (step 64). The user clicks/presses two opposing corners within the macroscopic image 74, thus defining a rectangular region 114 the user wishes to acquire. In this manner, the user can select the overall X, Y region at which each VivaBlock® mode acquisition will be carried out by system 10 at the respective target depth in Z from FIG. 9. In the case of lesion 72 of the example of FIGS. 3-10, a 6 by 7 block area including lesion 72 is selected. If the user wishes to change region 114, he may press once outside the selected region 114 to clear the region, and then re-tap opposing corners to select again. Optionally, the corner may be readjusted by dragging the corner with the finger. Unlike the user interface of U.S. Pat. No. 7,864,996 where the user may be restricted to whole millimeters, square map sizes around a center of region 114 can be selected to allow any size (in increments of Field of View) and any location over the gross macroscopic examination in the field of view of the confocal imager as denoted by the extent of grid 79.

After the region 114 is selected, the user taps the arrow button 115 on screen 54 to start VivaBlock® mode acquisition by system 10, and a set of images is captured in VivaBlock® mode at each target depth previously selected from one or more VivaStack® mode review screens (step 65). For each VivaBlock® mode set of images, the system 10 automatically positions the Z motor of the confocal imager 18 at the target depth for the VivaBlock® mode acquisition, and then the X, Y motors are stepped to capture a confocal image in accordance with each grid 79 block within region 114. If not using AIC mode, the system 10 may also set the laser power. The images are stored in the memory of computer system 14 to provide a composite image as shown for example in FIG. 17. For each VivaBlock® mode acquisition, the laser power is automatically set to the same as used when the image associated with the target depth was captured in the VivaStack® mode, unless AIC was used when that image was captured in VivaStack® mode, in which case the VivaBlock® mode is specified only at the depth.

Similarly to VivaStack® mode acquisition, between each automatically acquired image in the VivaBlock® mode, a screen 54 similar to FIG. 6 is shown with each set of images captured in VivaBlock® mode prior to or after being formed into a composite image by computer system 12 of system 10, allowing the user to accept, reject or review the images or composite image before proceeding to the next VivaBlock® mode acquisition at the next successive depth, if any, in the same manner as described earlier in connection with FIG. 6 for each VivaStack® mode acquisition. If the user cancels the VivaBlock® mode acquisition, the system returns to screen 54 of FIG. 9 to enable the user to make any changes in depth selection(s), and/or region 114 selection, prior to starting VivaBlock® acquisition of any set of VivaBlock® mode images not yet completed. This allows the user to make adjustments as needed during the automated acquisition process.

Figure 11:
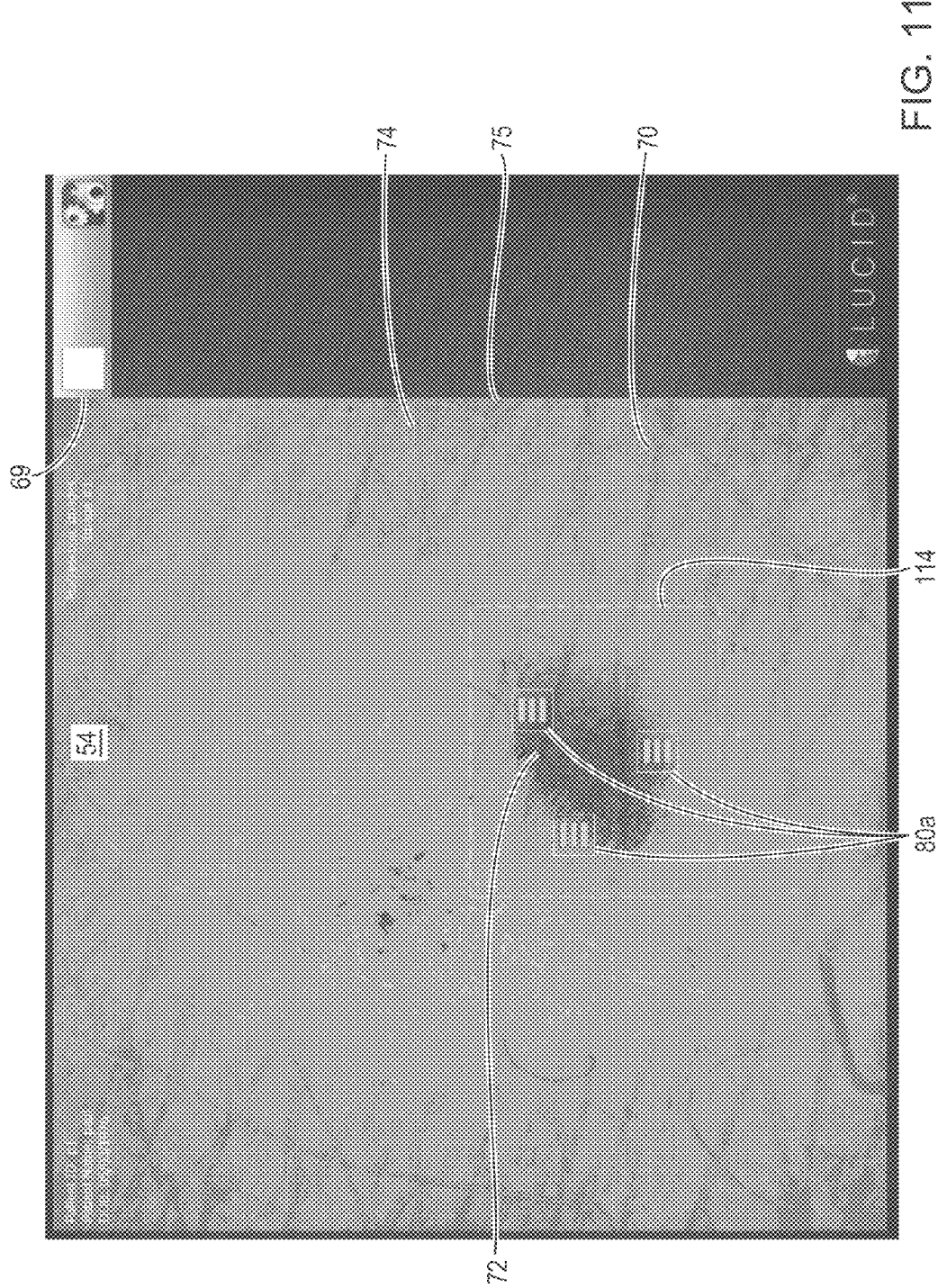
FIGS. 11-13 are example user interface screens on the display of the system of FIG. 1A for review of images captured in the VivaBlock® mode within the selected region of FIG. 10 and in the VivaStack® mode by graphics overlaid on the macroscopic image.

After images in VivaBlock® mode are captured, the screen of 54 of FIG. 11 is displayed as a post-capture "session map" after the VivaStack® mode images and then VivaBlock® mode images have been automatically captured and stored in memory of computer system 14 (step 66). In the example described above in prior FIGS. 3, 4, and 6-10, images captured in VivaStack® mode are shown at locations 80a and a dotted line encapsulating the region 114 that was mapped with VivaBlock® mode acquisition.

To review a VivaStack® mode acquisition, its associated icon at location 80a is tapped by the user, and then loaded from memory of computer system 14 for display on screen 54, such as shown for example in FIG. 6 (step 67).

Figure 12:
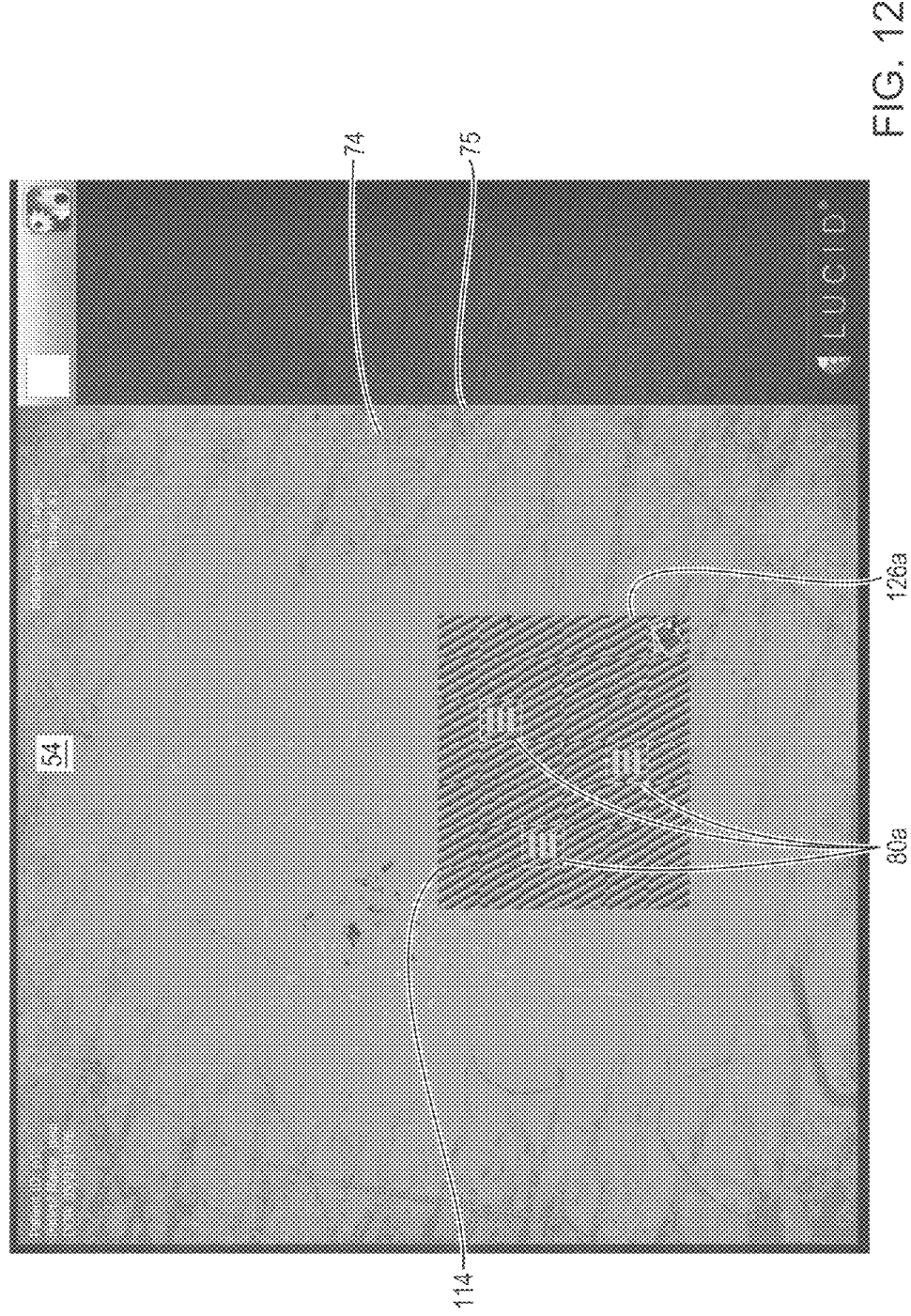
Figure 13:
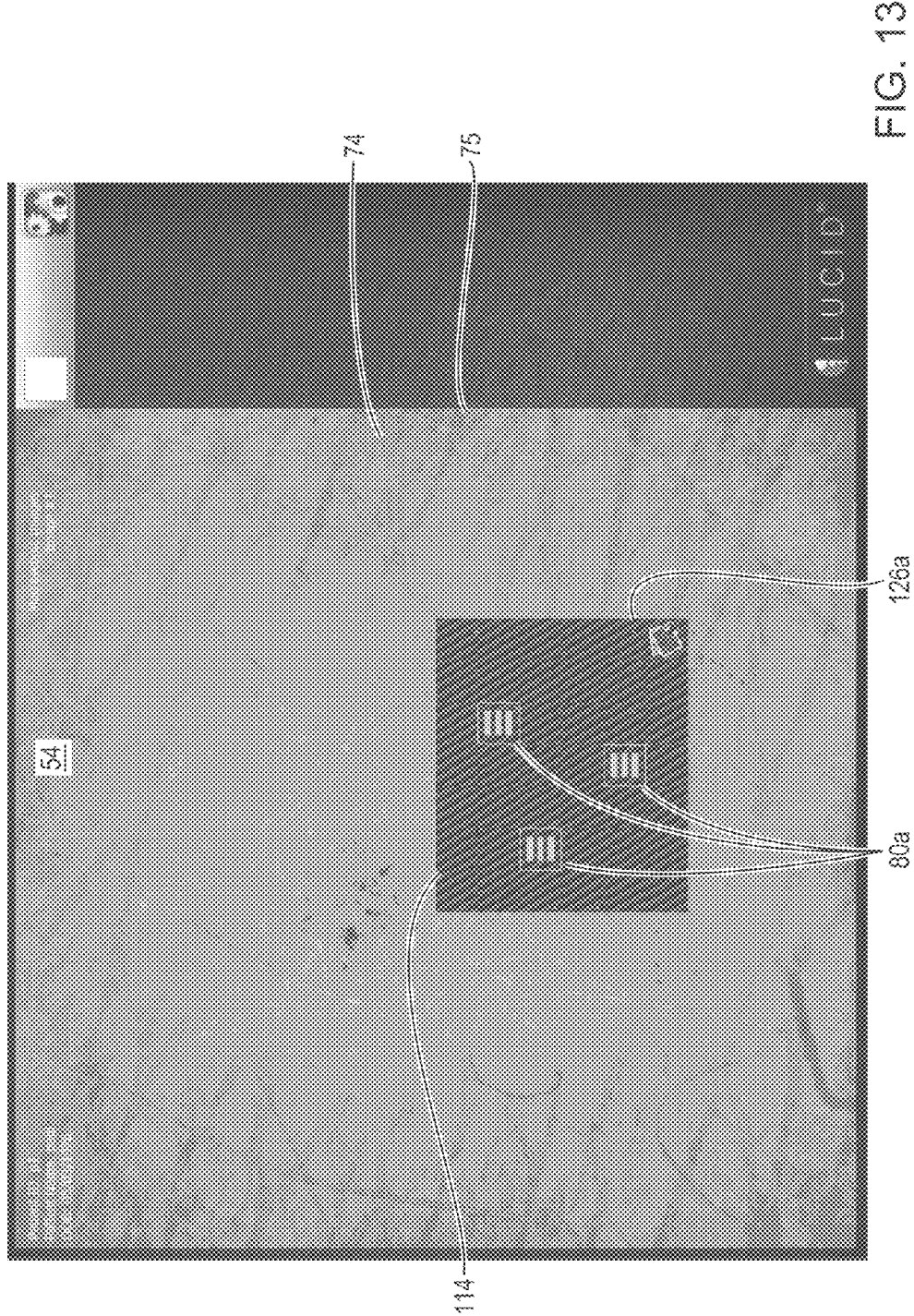
Figure 17:
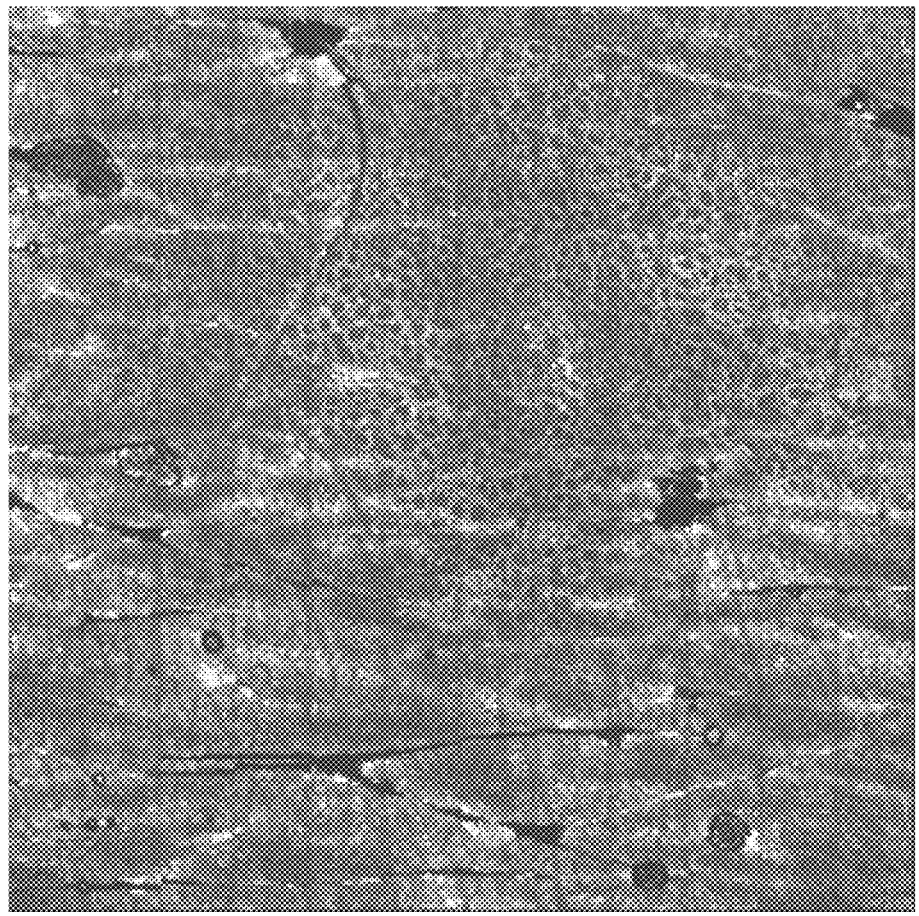
FIG. 17 is an example of an image obtained in the VivaBlock® mode, representing a composite image or map of group of images from the confocal imager at one of the selected depths as may be displayed during review on FIGS. 11-13.

To review a VivaBlock® mode acquisition in region 114, tapping of screen 54 inside the mapped region 114 (other than icons 80a) displays in region 114 a VivaBlock® mode composite image 126a, as shown for example in FIG. 12 (step 69). By clicking or tapping repeatedly, inside the mapped region 114 (other than icons 80a) the user can scroll through composite images of each successive depth (with or with one of the images in that succession being the macroscopic image associated with region 114) if more than set of images had been captured in VivaBlock® mode, as shown by FIGS. 12 and 13 for VivaBlock® mode acquisitions 126a and 126b, respectively. By clicking or tapping outside the region 114 in window 75, the composite map is hidden and the macroscopic region 114 of image 74 is again displayed. Thus, the user can quickly tap inside or outside the region to visually compare/toggle a VivaBlock® mode confocal examination with the gross macroscopic region 114 to which it relates. For purposes of illustration, the composite image or map of each VivaBlock® mode acquisition of FIGS. 12 and 13 are illustrated by diagonal lines, but an example of a composite image or map is shown in FIG. 17. The confocal panel 69 is replaced with a thumbnail of the macroscopic image 74, and clicking on it brings up the other thumbnails for review or selection of other capture images related to the tissue being imaged. For purposes of illustration the thumbnail of image 74 is shown as a white box.

Optionally, the user may adjust a visual slider (not shown) to adjust the transparency in order to blend the composite map of a VivaBlock® mode acquisition with region 114 of the macroscopic image 74 as described in U.S. Pat. No. 7,864,996 with respect to different confocal images to adjust the contribution of two different overlaid images. The graphic icon at the bottom right of region 114 of region 114 of FIGS. 12 and 13 when pressed by the user loads the VivaBlock® mode acquisition at high resolution for pan/zoom in a full-screen mode.

Figure 14:
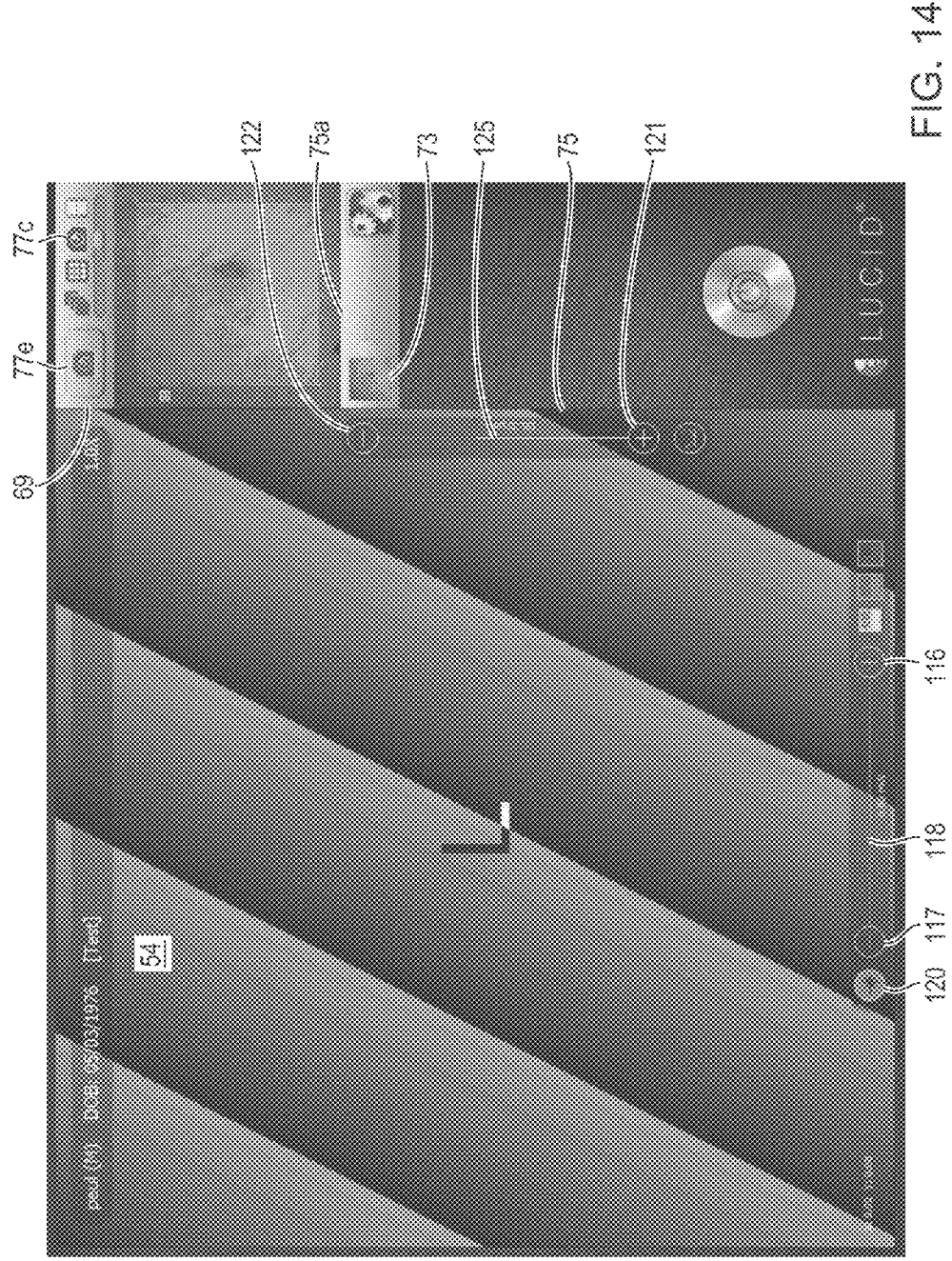
FIG. 14 is an example of the user interface screen on the display of the system of FIG. 1A during single image capture manual mode of displayed images from the confocal imager of FIG. 1A.

Referring to the panel of FIG. 3 showing the user interface screen 54 just after macroscopic image 74 capture, the user may select single image capture mode of displayed images from the confocal imager 18 by tapping button 77c. An example of the screen 54 during single image capture manual mode is shown in FIG. 14 in which the live image feed from confocal imager is displayed in window 75, and macroscopic image 74 is now displayed in window 75a. The laser power is selected by buttons 116 and 117 in which the user may press the +/− buttons 116 and 117 on the horizontal slider 118 to increase or decrease, respectively, the level of laser power (confocal imaging power), or select button 120 for AIC control, as described earlier. The user may also press anywhere on the line 118 between the +/− buttons to "jump" to a power. The vertical depth slider functions in the same way. Buttons 121 and 122 control depth of imaging (Z stage motor position) in which the user may press the +/− buttons 121 and 122 or on the vertical slider 123 to increase or decrease imaging depth at an X,Y motors location as highlight by a color, such as blue, in the macroscopic image 74 of window 54a. Such X,Y motors location can be changed by the user sliding his finger in window 74 in a directed direction, or similarly using image 74 when flipped into window 54. If the user wished to capture a confocal image being displayed, button 77e (now with a Single Capture Mode graphic) is tapped by the user in which system 10 being in Single Capture Mode stored the image in window 74 in memory of computer system 14.

Figure 15:
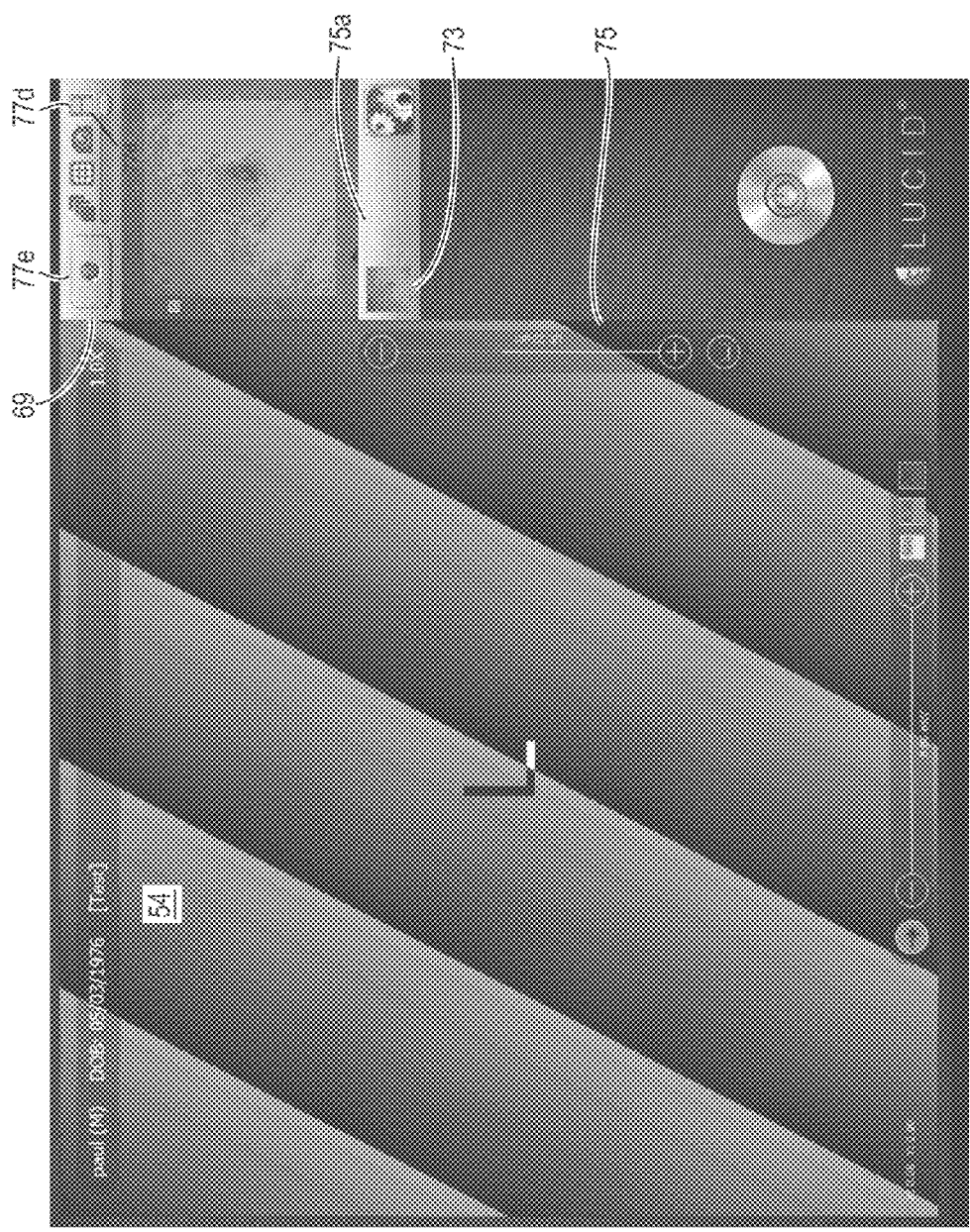
FIG. 15 is an example of the user interface screen on the display of the system of FIG. 1A during video capture manual mode of displayed images from the confocal imager of FIG. 1A.

The user may select video image capture mode of displayed images from the confocal imager 18 by tapping button 77d. In response, system 10 provides a screen 54 such as shown in FIG. 15 which is the same as screen 54 of FIG. 14, but where button 77e has a red circle icon which enables start video capture and then stop video capture of confocal images displayed in window 75. The user cannot change modes while a block, stack, or video is being acquired. The acquisition needs to be complete (or stopped in the case of video) to change modes.

Figure 5G:
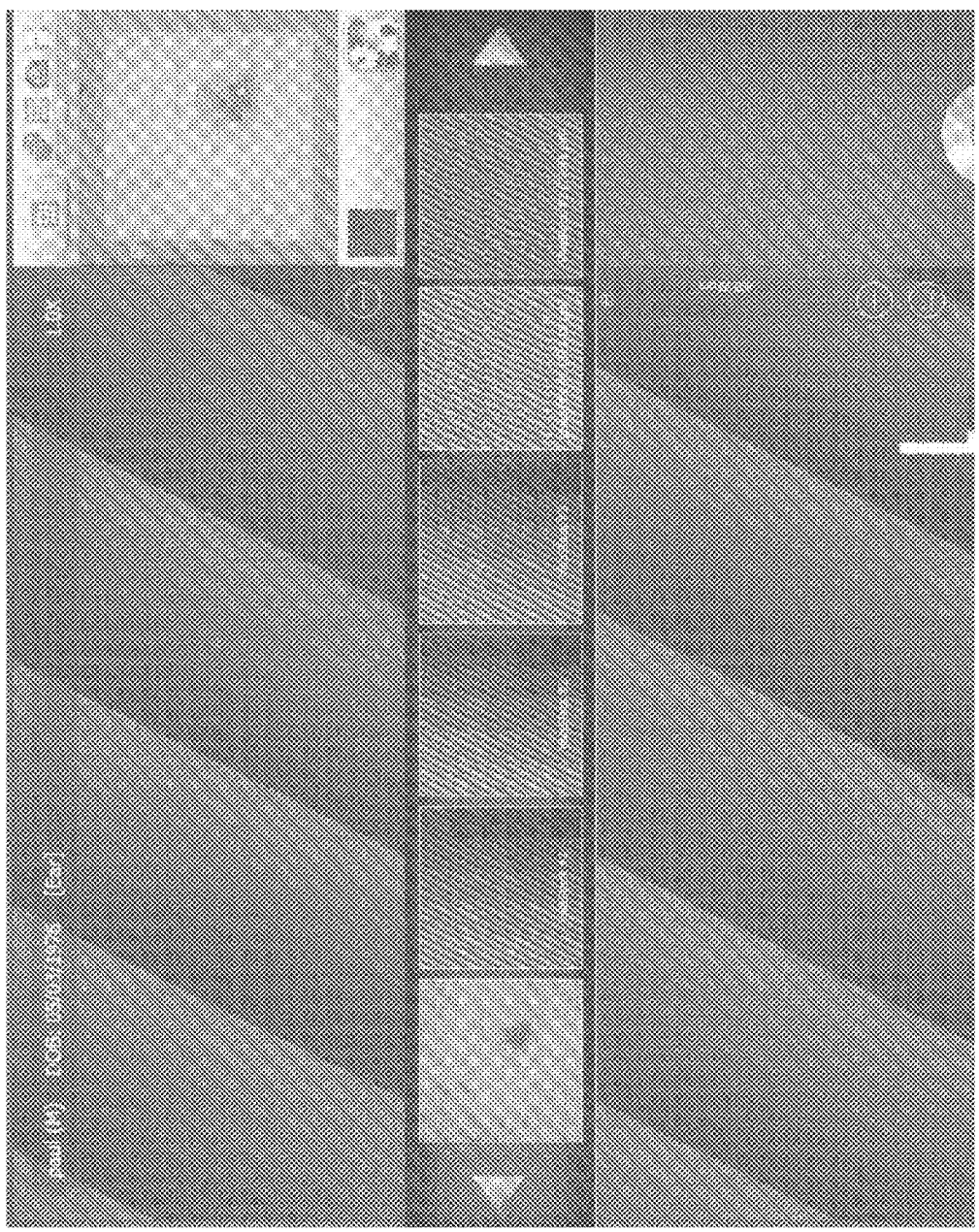

Referring to FIG. 5G, to review all images during any of the above described modes of operation of system 10, a button 73 is provided on screen 54 which when pressed by the user brings up for display thumbnail images of all captured images. If the user then presses one of these thumbnail images, it is then displayed at high resolution for pan/zoom in a full-screen mode. The graphic of button 73 is a thumbnail image of the last image capture by system 10. Also on screen 54 is start/stop confocal scan button 71 which when pressed either starts or stops confocal imager operation by system 10.

At any point during imaging, by clicking or pressing any previously captured image or region within a VivaStack® or VivaBlock®, the confocal imager 18 automatically returns to the position (both motor and laser power/wavelength) at which that particular frame was acquired as shows such in window 54a.

In the screen 54 of FIG. 3, grid 79 which overlays the macroscopic image 74 models the X,Y stage of confocal imager 18 and can mark the trail (such as with color or other indicator such a depth) as to locations (grid block) the X,Y, stage is navigated along with respect to image 74, and thus maintains information as to confocal imaging being performed by the user. Such functionality can also be used in the absence of a macroscopic image to navigate the X, Y stage of the confocal imager 18. In other words, the X/Y stage motors are controlled with finger swipes of the main window 75, such as left, right, up, down, and all four diagonal directions. The user interface described herein is thus operable with or without macroscopic imager 32 as part of system 10.

The current location of the confocal microscope X and Y motor stages may be highlighted by color in one of boxes of grid 79 laid on the macroscopic image 74. Further color can be indicative of depth in addition to current depth (position of Z stage in terms of imaging depth) being displayed on the screen. The user may reposition the X, Y motor stages to any block (or dragging finger along the grid) with respect to the tissue imaged at such location(s). Previously viewed X, Y blocks may continue to be highlighted by color to indicate the region imaged relative to the stage or, if captured, a macroscopic image.

Other VivaScope® confocal microscopes available from Lucid, Inc., such as the VivaScope® 2100 or VivaScope® 2500 may also be used in system 10 by adapting their imaging heads with tissue mount 48 so that they can be positioned to engage a tissue ring 30 when mounted to in-vivo patient or ex-vivo tissue sample. Although the application describes confocal imagers for imaging optical formed microscopic sections utilizing confocal microscopy, other imager may be used to provide optical formed microscopic sections operating in accordance with two-photon microscopy or optical coherence tomography. Also other optical microscopes may be also adapted with such tissue mount 48. Such as, for example, microscopes operating in accordance with optical coherence tomography or interferometry, such as described in Schmitt et al., "Optical characterization of disease tissues using low-coherence interferometry," Proc. Of SPIE, Volume 1889 (1993), or two-photon microscopy, such as described in U.S. Pat. No. 5,034,613 to Denk et al., issued Jul. 23, 1991 and incorporated herein by reference in its entirety.

Alternative embodiments are envisioned. For example, one may use the system 10 to capture very closely spaced layers (i.e., in the VivaBlock® mode) disposed over each other in a Z direction, and then reconstruct those layers in a 3D space. One may then provide a finger/gesture controlled 3D visualization of the entire lesion from a gross macroscopic image through each confocal imaged layer of the skin. Since each image in the reconstruction is related to all others within the coordinate space, interactive 3D modeling of the entire lesion from skin down through cellular resolution confocal images may be provided, rather than having a single screen or panel for each series of images attained in the VivaBlock® or VivaStack® modes. In some embodiments, the software may be designed to instruct the hardware to capture the full breadth and depth of a lesion with no user interaction. The image set may subsequently be presented in a 3D space, allowing a user to visualize the lesion, and optionally directly scan to a particular location.

From the foregoing description, it will be apparent that an improved user interface software, and systems and methods using such user interface has been provided which offer an intuitive, user friendly, and touch-enabled imaging interface and is thus especially suitable for clinicians. The foregoing description should be taken as illustrative and not in a limiting sense. While several aspects of the present invention have been described and depicted herein, alternative aspects may be effected by those skilled in the art to accomplish the same objectives. Accordingly, it is intended that the appended claims cover all such alternatives as fall within the true spirit and scope of the invention.

What is claimed is:

1. A method for imaging tissue, comprising:
causing a macroscopic image of a tissue surface captured by a macroscopic imager to be displayed on a visual display;
receiving a user-defined selection of at least one portion of the macroscopic image;
causing, after receiving the user-defined selection of the at least one portion of the macroscopic image, a graphical input to be displayed on the visual display;
for each user-defined selected portion of the macroscopic image, using user-controllable parameters specified within the graphical input to cause a plurality of confocal images to be captured by a confocal imager at different depths in a corresponding portion of the tissue and to be displayed on the visual display;
receiving a user-defined selection, from among the plurality of confocal images, of at least one target depth image having a particular depth associated therewith; and
for each user-defined selected target depth image, instructing the confocal imager to capture a plurality of additional images at neighboring locations over a selected region of the tissue and at a common depth with the particular depth associated with the user-defined selected target depth image.

2. The method of claim 1, wherein the visual display comprises a touch screen.

3. The method of claim 2, wherein receiving the user-defined selection of the at least one portion of the macroscopic image comprises identifying at least one touch of at least one portion of the macroscopic image displayed on the touch screen.

4. The method of claim 2, wherein receiving the user-defined selection of the at least one target depth image comprises identifying at least one touch of at least one confocal image displayed on the touch screen.

5. The method of claim 2, further comprising identifying the selected region of the tissue by identifying at least one touch of the macroscopic image displayed on the touch screen.

6. The method of claim 1, wherein the selected region of the tissue corresponds to a user-adjustable region overlaid upon the macroscopic image.

7. The method of claim 1, further comprising causing a grid to be overlaid upon the macroscopic image, the grid dividing the macroscopic image into blocks representing frame positions of a stepper motor for the confocal imager.

8. The method of claim 1, wherein the user-controllable parameters comprise at least one of a depth of the confocal images to be captured, a layer count for the confocal images to be captured, and a laser power change with depth for the confocal images to be captured.

9. The method of claim 1, wherein the plurality of additional images are individually captured at the neighboring locations over the selected region of the tissue.

10. The method of claim 9, further comprising forming, for at least one depth common to a user-defined selected target depth image, a composite image of the selected region of the tissue from the individually captured additional images.

11. The method of claim 10, further comprising causing the composite image to be displayed on the visual display.

12. A system for imaging tissue, comprising:
   computer memory for storing images captured by macroscopic and confocal imagers, and for storing code defining a set of instructions; and
   a processor for executing the set of instructions,
   wherein the code comprises an imaging module configured to:
   (i) cause a macroscopic image of a tissue surface captured by the macroscopic imager to be displayed on a visual display;
   (ii) receive a user-defined selection of at least one portion of the macroscopic image;
   (iii) cause, after receiving the user-defined selection of the at least one portion of the macroscopic image, a graphical input to be displayed on the visual display;
   (iv) for each user-defined selected portion of the macroscopic image, use user-controllable parameters specified within the graphical input to cause a plurality of confocal images to be captured by the confocal imager at different depths in a corresponding portion of the tissue and to be displayed on the visual display;
   (v) receive a user-defined selection, from among the plurality of confocal images, of at least one target depth image having a particular depth associated therewith; and
   (vi) for each user-defined selected target depth image, instruct the confocal imager to capture a plurality of additional images at neighboring locations over a selected region of the tissue and at a common depth with the particular depth associated with the user-defined selected target depth image.

13. The system of claim 12, wherein the visual display comprises a touch screen.

14. The system of claim 13, wherein the imaging module, in receiving the user-defined selection of the at least one portion of the macroscopic image, is configured to identify at least one touch of at least one portion of the macroscopic image displayed on the touch screen.

15. The system of claim 13, wherein the imaging module, in receiving the user-defined selection of the at least one target depth image, is configured to identify at least one touch of at least one confocal image displayed on the touch screen.

16. The system of claim 13, wherein the imaging module is further configured to identify the selected region of the tissue by identifying at least one touch of the macroscopic image displayed on the touch screen.

17. The system of claim 12, wherein the selected region of the tissue corresponds to a user-adjustable region overlaid upon the macroscopic image.

18. The system of claim 12, wherein the imaging module is further configured to cause a grid to be overlaid upon the macroscopic image, the grid dividing the macroscopic image into blocks representing frame positions of a stepper motor for the confocal imager.

19. The system of claim 12, wherein the user-controllable parameters comprise at least one of a depth of the confocal images to be captured, a layer count for the confocal images to be captured, and a laser power change with depth for the confocal images to be captured.

20. The system of claim 12, wherein the plurality of additional images are individually captured at the neighboring locations over the selected region of the tissue.

21. The system of claim 20, wherein the imaging module is further configured to form, for at least one depth common to a user-defined selected target depth image, a composite image of the selected region of the tissue from the individually captured additional images.

22. The system of claim 21, wherein the imaging module is further configured to cause the composite image to be displayed on the visual display.

23. A system for imaging tissue, comprising:
   a macroscopic display module for causing a macroscopic image of a tissue surface captured by a macroscopic imager and stored in computer memory to be displayed on a visual display and for causing a graphical input to be displayed on the visual display;
   a first selection module for receiving a user-defined selection of at least one portion of the macroscopic image;
   a confocal display module for causing a plurality of confocal images captured, for each user-defined selected portion of the macroscopic image, by a confocal imager at different depths in a corresponding portion of the tissue and stored in the computer memory to be displayed on the visual display;
   a second selection module for receiving a user-defined selection, from among the plurality of confocal images, of at least one target depth image having a particular depth associated therewith; and
   an instruction module for instructing the confocal imager to capture, for each user-defined selected target depth image, a plurality of additional images at neighboring locations over a selected region of the tissue and at a common depth with the particular depth associated with the user-defined selected target depth image.

* * * * *